Feb. 9, 1960 A. H. LLOYD 2,924,156
BOX SETTING UP MACHINE
Filed May 24, 1954 10 Sheets-Sheet 1

INVENTOR.
ALLEN H. LLOYD
BY
Joseph A. Pave
Attorney

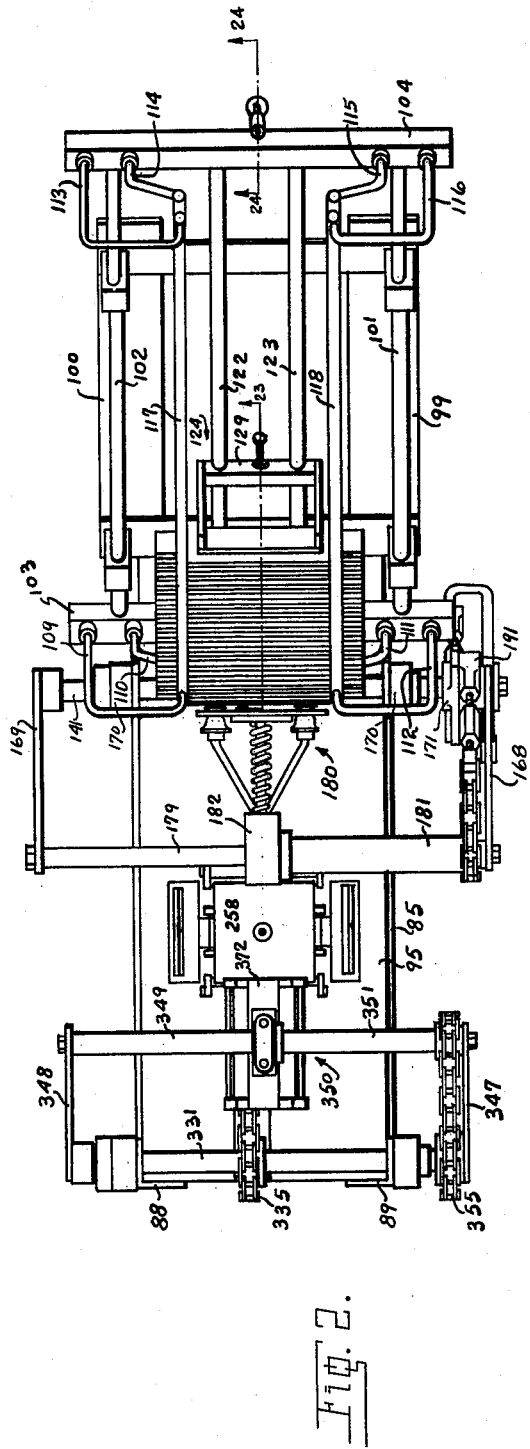
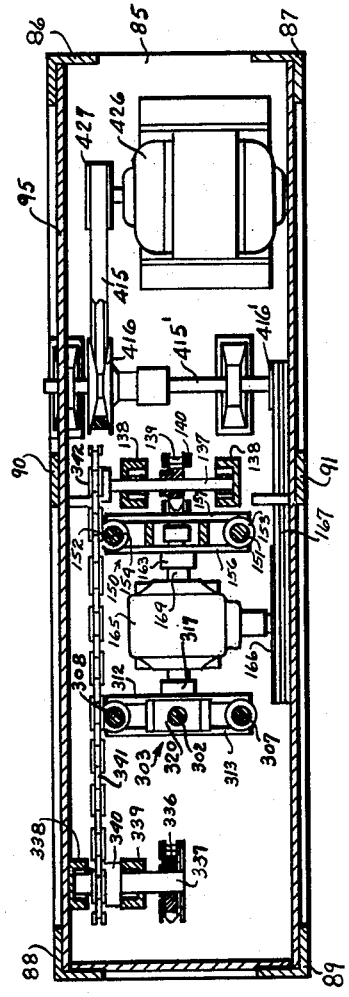
INVENTOR.
ALLEN H. LLOYD

Feb. 9, 1960   A. H. LLOYD   2,924,156
BOX SETTING UP MACHINE
Filed May 24, 1954   10 Sheets-Sheet 4
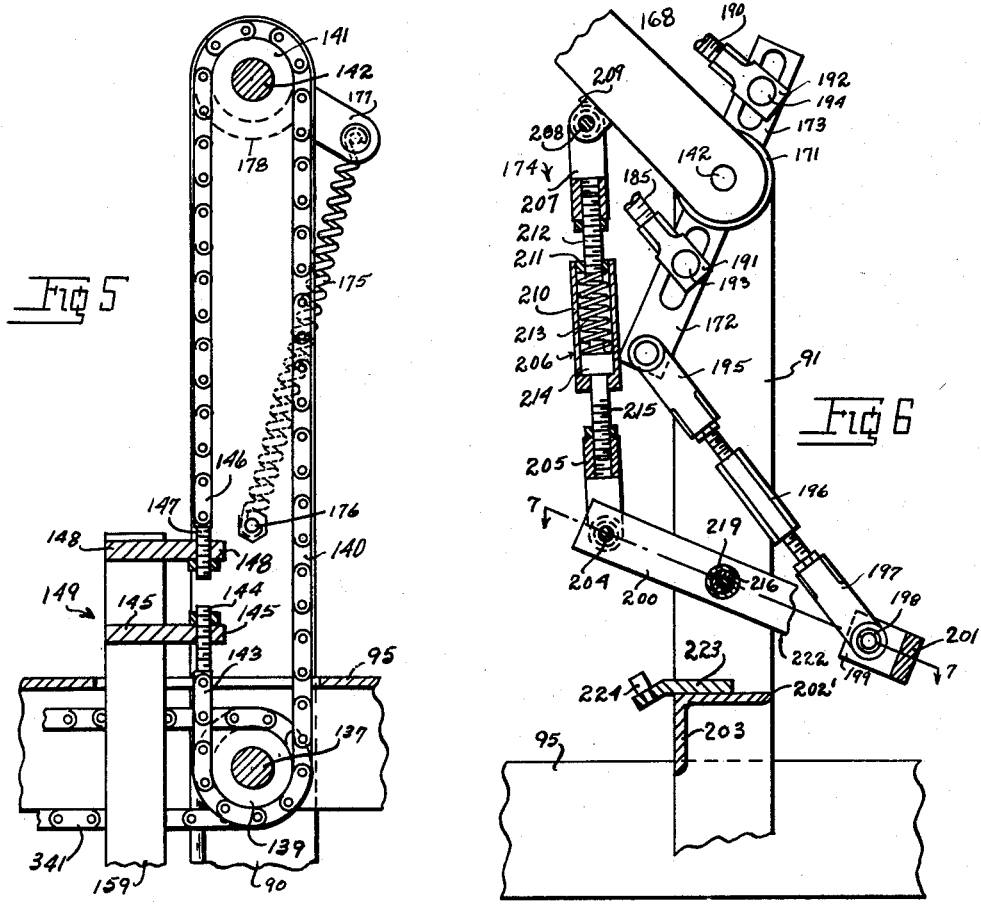
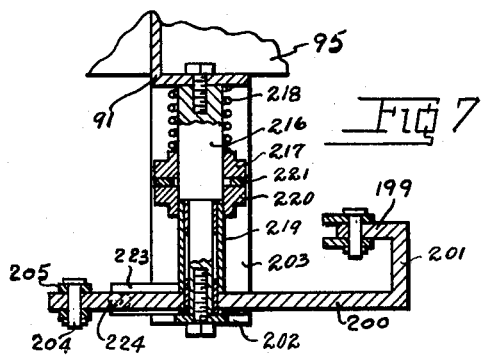
INVENTOR.
ALLEN H LLOYD
BY
Joseph A. Rave
Attorney Feb. 9, 1960     A. H. LLOYD     2,924,156
BOX SETTING UP MACHINE
Filed May 24, 1954     10 Sheets-Sheet 5
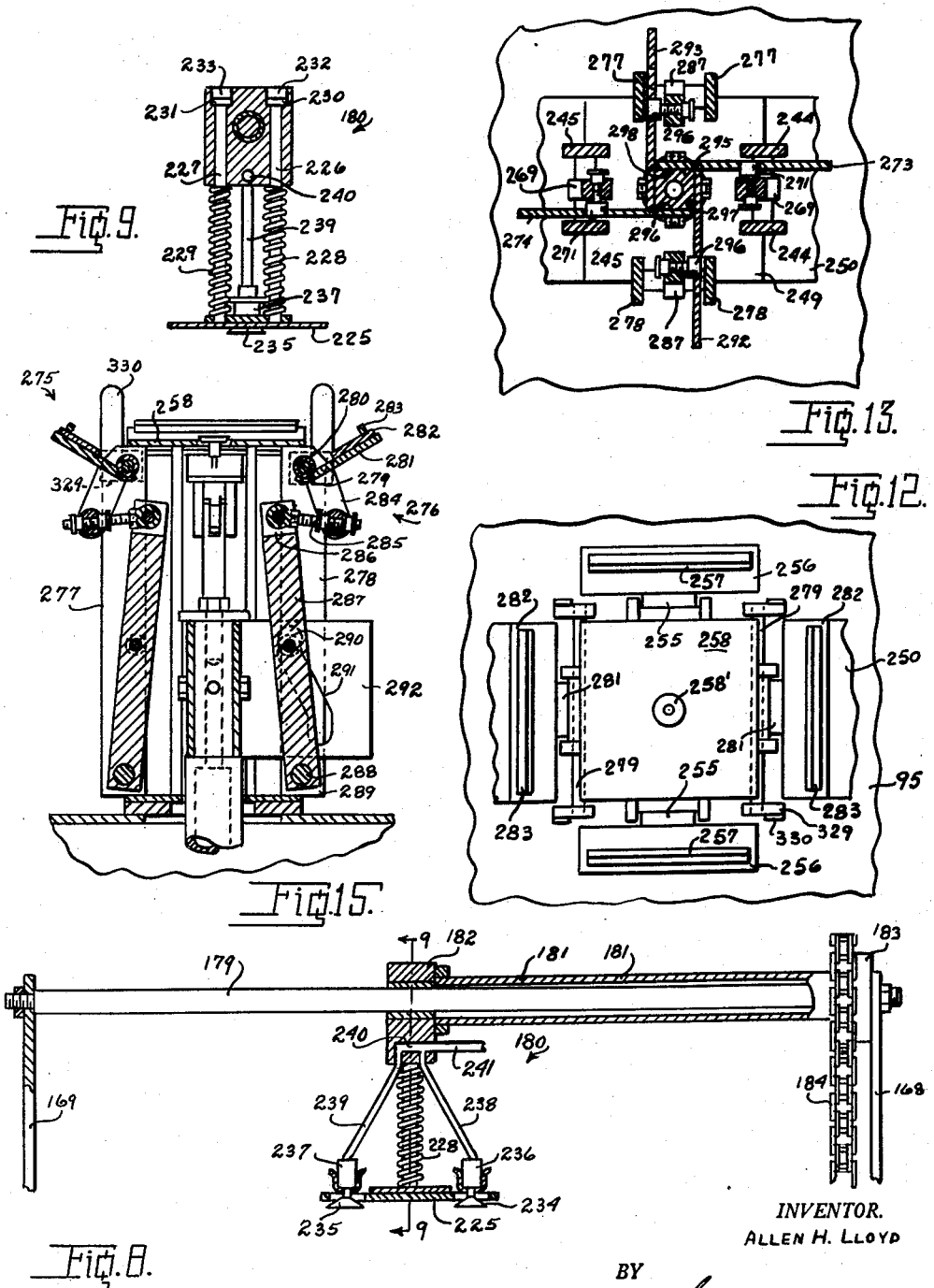
INVENTOR.
ALLEN H. LLOYD

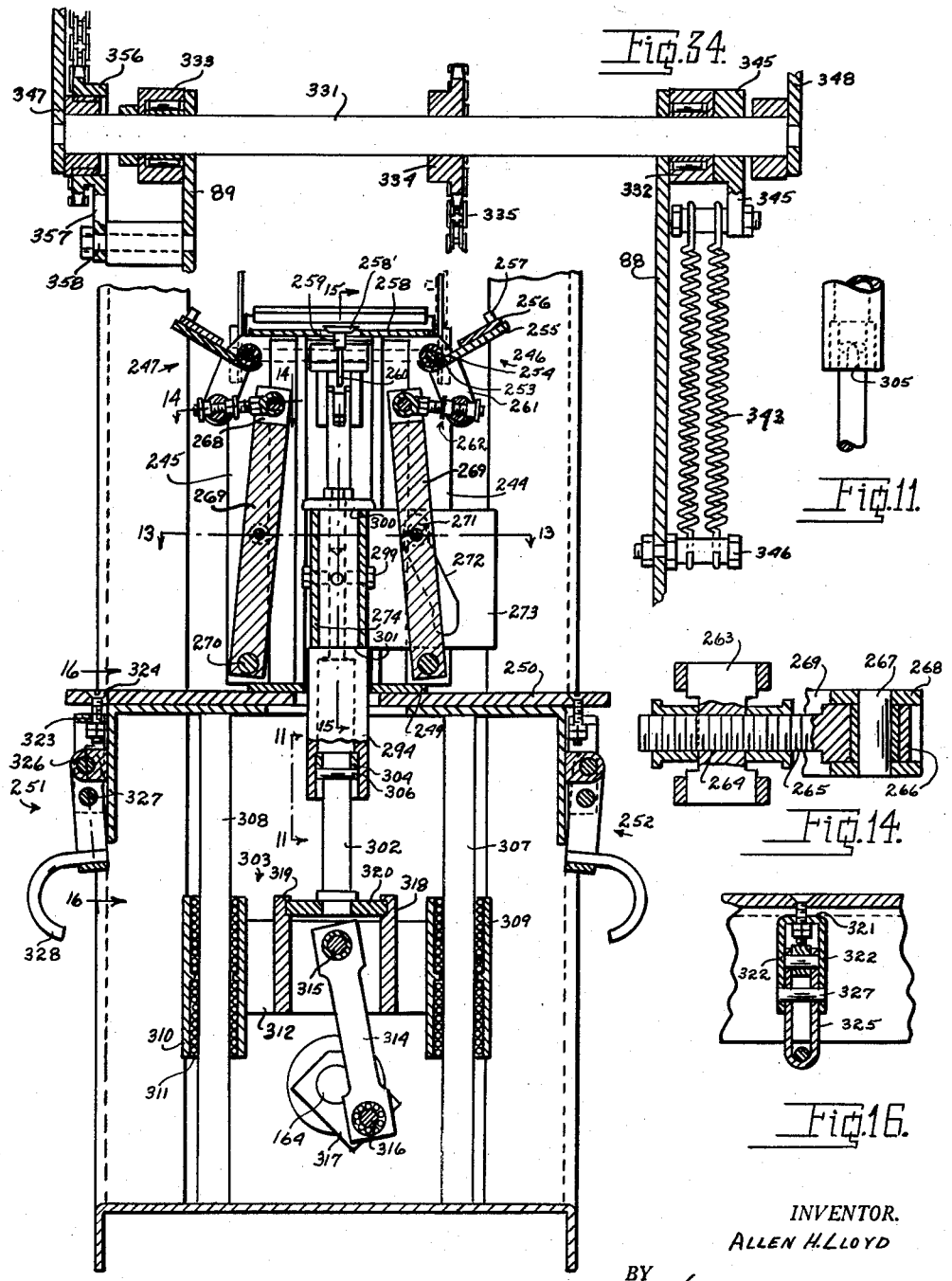

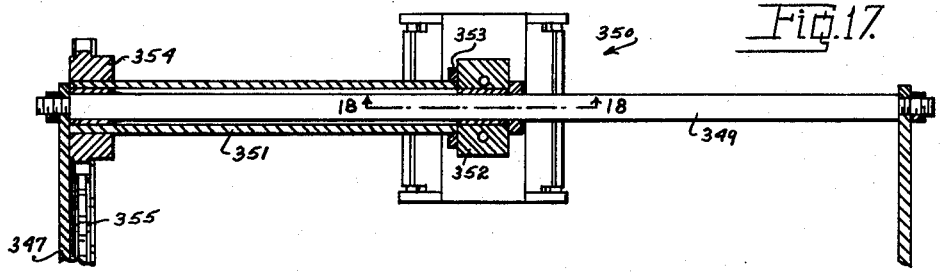
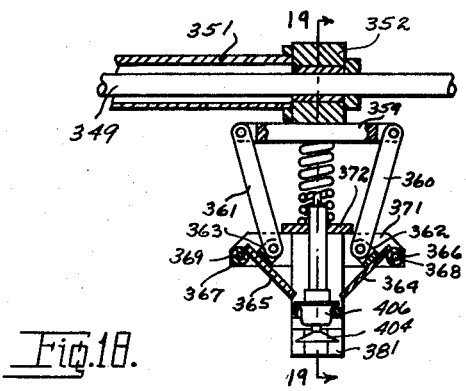
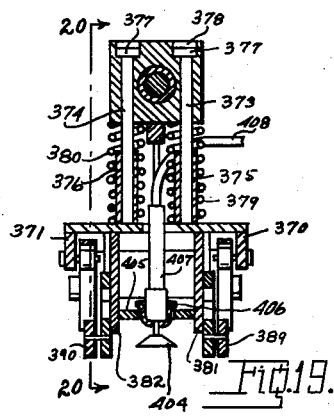
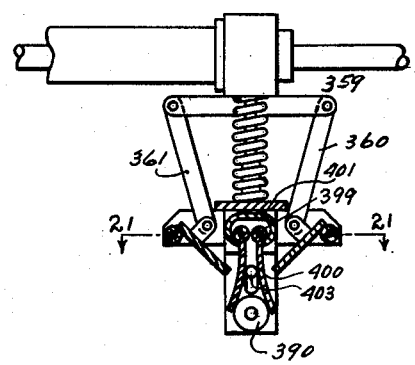
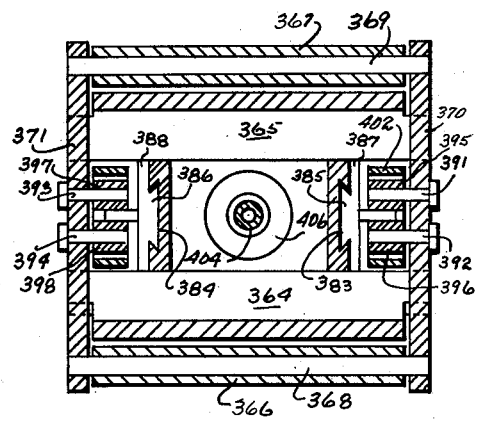

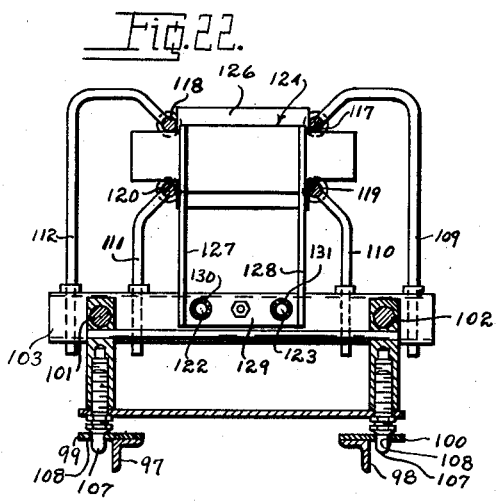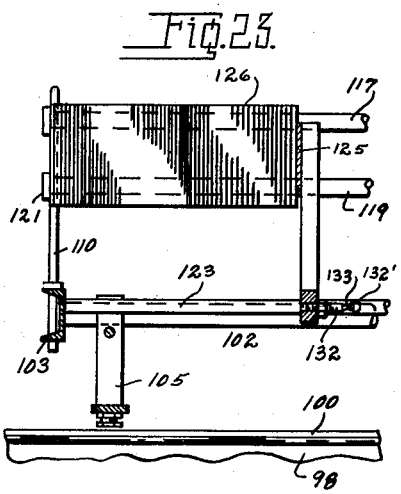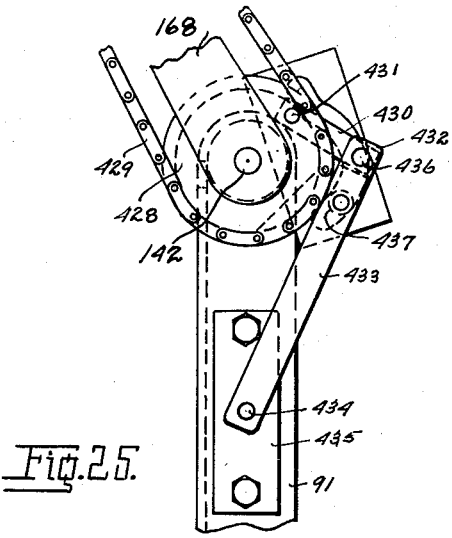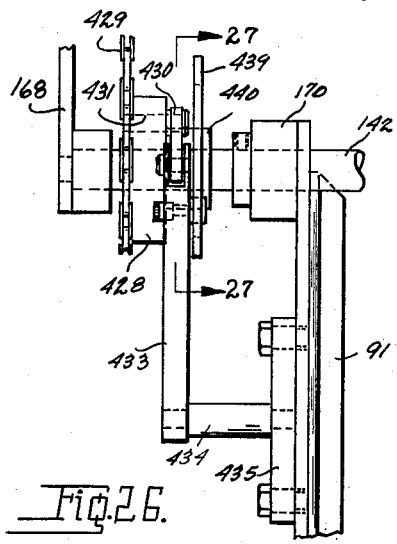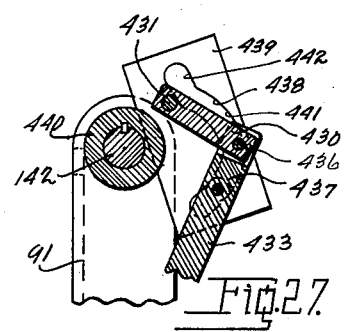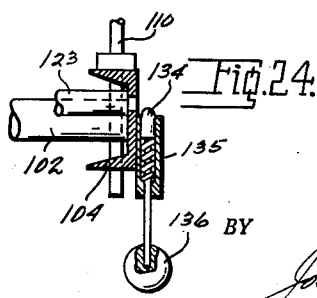
INVENTOR.
ALLEN H. LLOYD

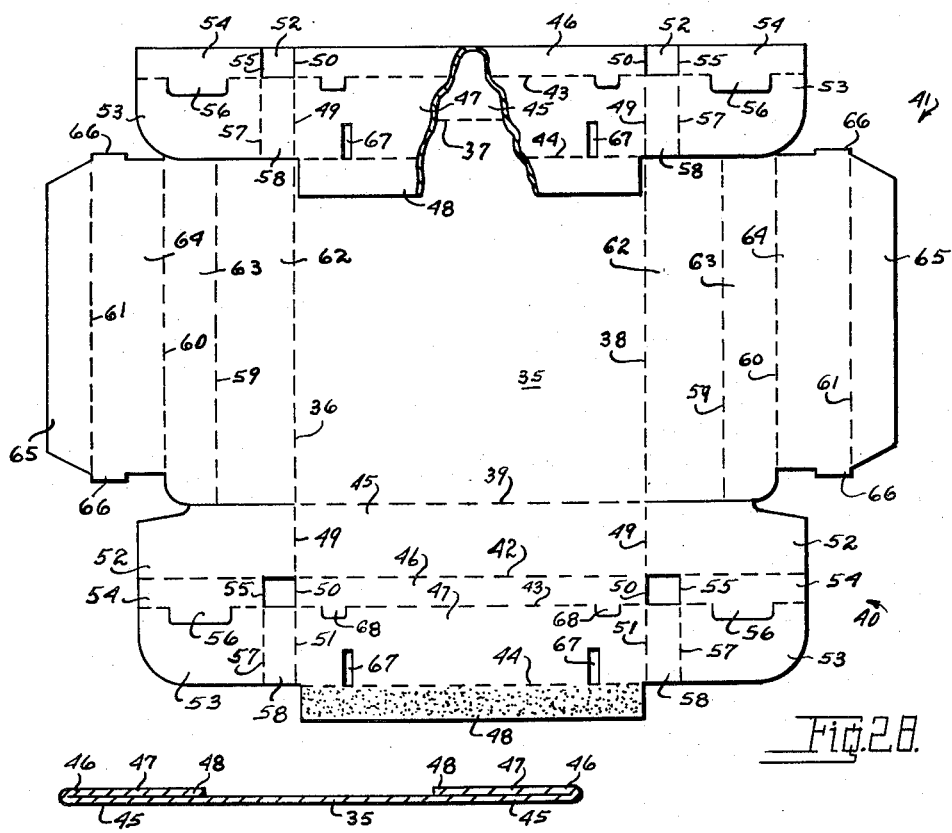
Fig.28.
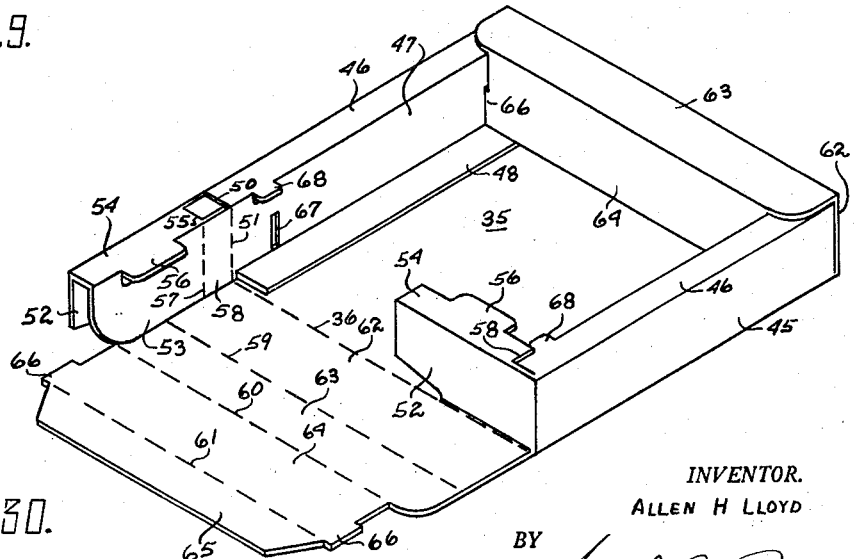
Fig.29.
Fig.30.
INVENTOR.
ALLEN H LLOYD
BY
Joseph A. Rave
Attorney Feb. 9, 1960    A. H. LLOYD    2,924,156
BOX SETTING UP MACHINE
Filed May 24, 1954    10 Sheets-Sheet 10
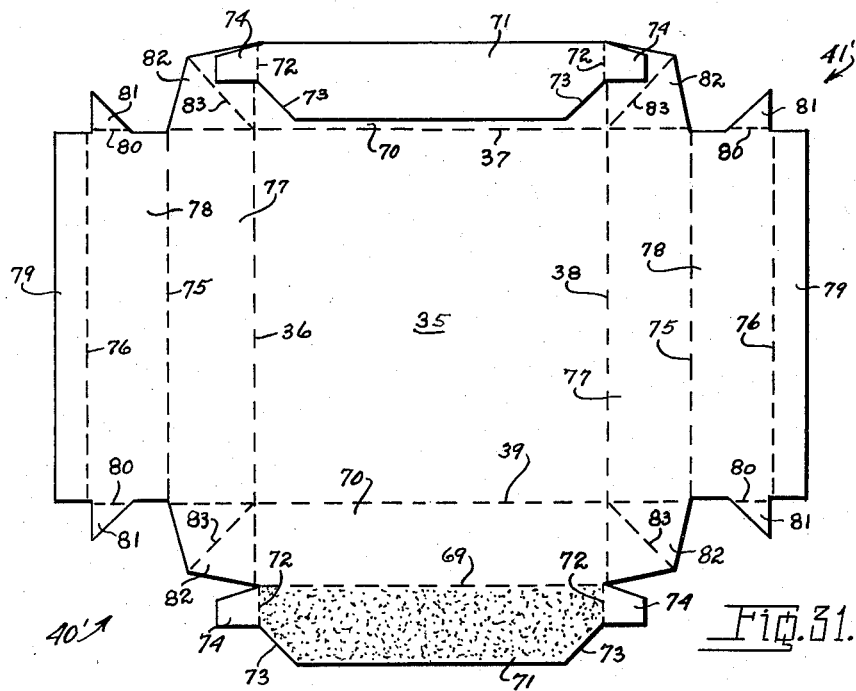
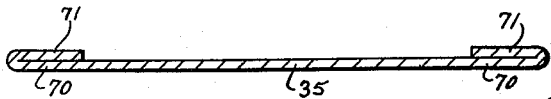
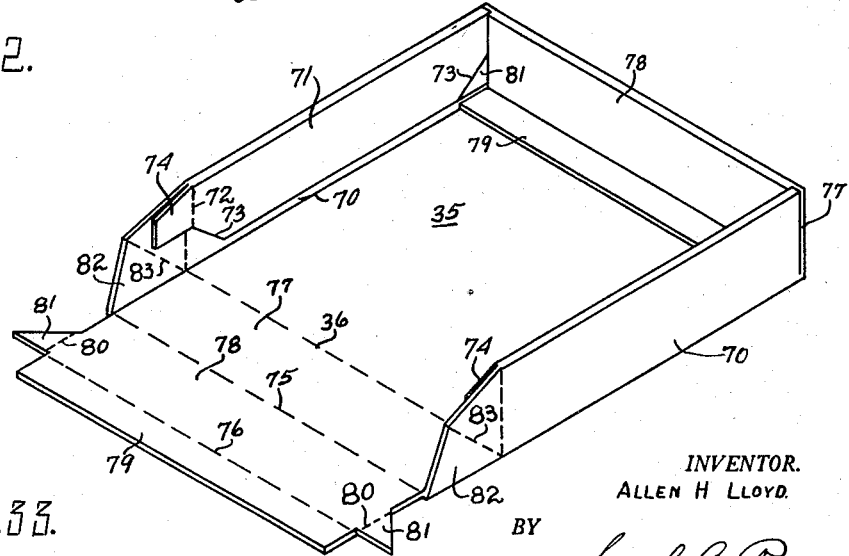
INVENTOR.
ALLEN H. LLOYD.
BY
Joseph A. Rave
Attorney

United States Patent Office 2,924,156
Patented Feb. 9, 1960

2,924,156

BOX SETTING UP MACHINE

Allen H. Lloyd, Terrace Park, Ohio, assignor to Tech-Art Inc., Milford, Ohio, a corporation of Ohio Application May 24, 1954, Serial No. 431,991

12 Claims. (Cl. 93—49)

This invention relates to a box setting-up machine, that is, a machine for setting up knocked-down blanks into a box or carton for subsequent filling.

The machine of the present invention is an improvement on the box setting-up machines disclosed in applicant's applications Serial Nos, 362,350, filed June 17, 1953, which issued as Patent No. 2,883,915, dated April 28, 1959, and 375,504, filed August 20, 1953, which issued as Patent No. 2,882,803, dated April 21, 1959.

The machine of the present invention is for setting up blanks that have been cut to a predetermined configuration and are suitably scored to indicate where the various folds are to occur, that is, the side walls, end walls, tucking flaps, and the like. Basically, the blank is scored along the edges of the bottom panel and which scores integrally connect extensions which are in turn scored to form the side and end walls, whether of single thickness, double thickness, or spaced apart wall members. In addition, the extensions may be provided with tabs at the ends of said walls, or wall members, which are to be arranged with respect to the remaining walls for cooperation therewith in holding the walls in erected positions.

The machine of the present invention is adapted for transferring a knocked-down blank from a magazine or supply to forming mechanism which sets up the knocked-down blank and cooperates with additional means for completing the erection of the knocked-down blank and transferring same from the machine to a container, discharge conveyor, or the like. The setting up of the knocked-down blank to a fully erected carton is automatic from the removing of the blank from the magazine or supply to the discharging thereof as an erected box from the machine.

It is, therefore, the principal object of the present invention to provide a machine for automatically setting up the walls and tucking flaps of a box from a knocked-down blank and discharging same in its fully erected position from the machine.

Another object of the present invention is the provision of an improved machine for setting up a knocked-down box blank in which the walls are provided with a depending inner wall member and wherein the machine automatically inwardly folds said wall members.

Another object of this invention is the provision of an improved machine that, through simplified mechanism, automatically and in timed relation sets up the side and end walls of a four-sided box into operative positions and with tucking flaps of certain walls automatically arranged with respect to the side and end walls of the carton.

A further and specific object of this invention is the provision of a box setting up machine in which the knocked-down box blanks are automatically transferred from a magazine or supply to the forming mechanism, the said knocked-down box blank automatically set up, and the setup box automatically removed from the forming mechanism and discharged from the machine.

A still further object of the present invention is the provision of a simplified means for operating or actuating the setting-up mechanism which actually erects the box walls.

A still further object of the present invention is the provision of a simple yet extremely efficient mechanism for supplying knocked-down box blanks to the setting-up mechanism and which supplying mechanism may be termed a magazine.

A still further and specific object of the present invention is the provision of a machine for accomplishing the foregoing objects and in which the setting-up mechanism may be readily changed for adapting the machine for different sizes and specific construction of boxes.

It is also an object of the present invention to provide an improved transfer mechanism whereby the same is properly positioned with respect to a knocked-down box supply or magazine for picking up a single box blank.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 2 is a top plan view of the machine illustrated in Fig. 1.

Fig. 3 is a horizontal sectional view through the machine of Fig. 1 as seen from line 3—3 on said Fig. 1.

Fig. 5 is a fragmentary sectional view taken on line 5—5 on Fig. 4.

Fig. 6 is a fragmentary vertical sectional view taken through a plane offset from that of Fig. 5 on line 6—6 on Fig. 4.

Fig. 7 is a fragmentary sectional view taken at angles to Fig. 6 on line 7—7 on said Fig. 6.

Fig. 8 is an enlarged fragmentary sectional view taken through the transfer head operating mechanism as seen from line 8—8 on Fig. 1.

Fig. 9 is a sectional view taken at right angles to Fig. 8 as seen from line 9—9 on said Fig. 8.

Fig. 10 is an enlarged fragmentary sectional view through the knocked-down box blank sides setting up mechanism as seen from line 10—10 on Fig. 1.

Fig. 11 is a fragmentary elevational view taken on line 11—11 on Fig. 10, disclosing details in the construction of the setting-up mechanism.

Fig. 12 is a top plan view of the knocked-down blank box sides setting-up mechanism as disclosed in Fig. 10.

Fig. 13 is a fragmentary horizontal sectional view through the knocked-down blank box sides setting-up mechanism as seen from line 13—13 on Fig. 10.

Fig. 14 is an enlarged sectional view, through the actuating mechanism for the box wall setting-up plate, taken on line 14—14 on Fig. 10, and disclosing details in the construction thereof.

Fig. 15 is a fragmentary sectional view through the knocked-down box blank sides setting up mechanism taken at right angles to Fig. 10, as seen from line 15—15 on said Fig. 10.

Fig. 16 is a vertical sectional view taken on line 16—16 on Fig. 10 and showing details in the construction of a clamp mechanism forming a detail of the invention.

Fig. 17 is an enlarged fragmentary horizontal sectional view through the operating shaft for the box discharge mechanism as seen from line 17—17 on Fig. 1.

Fig. 18 is a vertical sectional view through the discharge head as seen from line 18—18 on Fig. 17.

Fig. 19 is a vertical sectional view taken at right angles to Fig. 18 as seen from line 19—19 on said Fig. 18.

Fig. 20 is a vertical sectional view similar to Fig. 18 taken in a plane to the left of said Fig. 18 as seen from line 20—20 on Fig. 19.

Fig. 21 is an enlarged horizontal sectional view as seen from line 21—21 on Fig. 20.

Fig. 22 is a transverse sectional view through the knocked-down blank supply magazine as seen from line 22—22 on Fig. 1.

Fig. 23 is a fragmentary longitudinal sectional view through the knocked-down blank supply magazine as seen from line 23—23 on Fig. 2.

Fig. 24 is an enlarged fragmentary sectional view through the knocked-down blank magazine feed lock as seen from line 24—24 on Fig. 2 and forming a detail of the construction.

Fig. 25 is a front elevational view of a portion of the disclosure in Fig. 1 illustrating a modification in the compensating means of the transfer mechanism.

Fig. 26 is a side elevational view of the mechanism disclosed in Fig. 25 as seen from the right hand side thereof.

Fig. 27 is a vertical sectional view through the parts of Fig. 25 as seen from line 27—27 on said Fig. 25.

Fig. 28 is a plan view of a box blank partly in its final knocked-down position and partly in extended form and illustrating a form of a box to be set up or erected by the machine of the present invention.

Fig. 29 is a transverse sectional view through a fully knocked-down blank and in the form in which it is supplied to the machine for setting-up purposes.

Fig. 30 is a perspective view of a box or carton partially erected from the knocked-down blank of Figs. 28 and 29 and illustrating the carton as erected by the machine of the present invention.

Fig. 31 is a view similar to Fig. 28 of a modified blank of a second form of box erectable on the machine of the present invention.

Fig. 32 is a transverse sectional view through the blank of Fig. 31 in its fully knocked-down condition and illustrating the condition of said blank when supplied to the machine for erection.

Fig. 33 is a perspective view of a partially erected box from the knocked-down blank of Figs. 31 and 32.

Fig. 34 is an enlarged fragmentary sectional view through the discharge mechanism actuating shaft as seen from line 34—34 on Fig. 1.

Throughout the several views of the drawings similar reference characters are employed to denote the same or similar parts.

Figure 1:
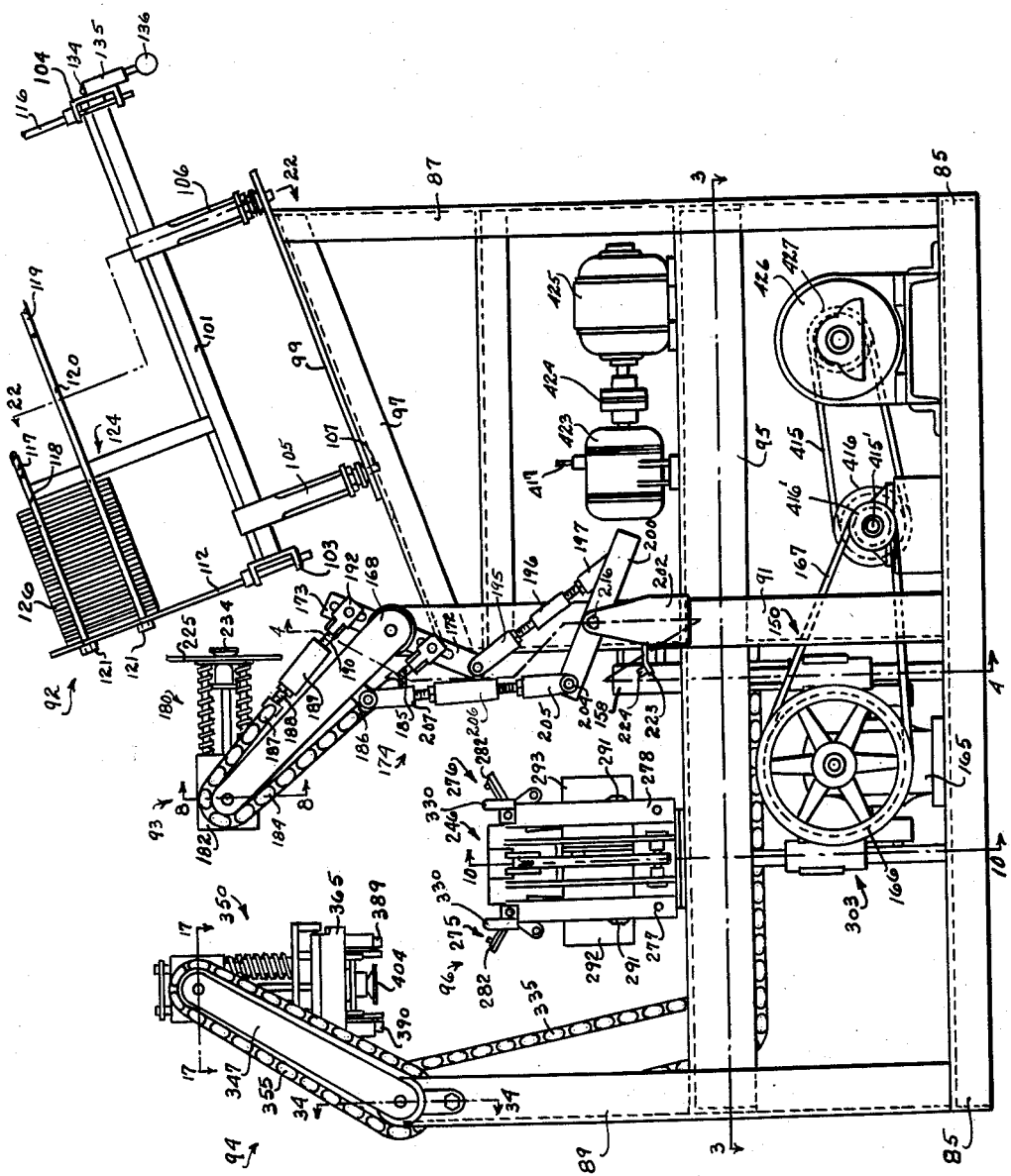
Fig. 1 is a side elevational view of the box setting-up machine of the present invention.

Before specifically describing the box or carton setting-up machine, it is deemed advisable to describe the type of box or carton which may be set up by the machine of the present invention, there is illustrated in the drawings two types of boxes, one of which has its side and end walls of double thickness while the other has its side and end walls of spaced apart inner and outer wall members. It is to be understood that while these specific boxes or cartons are illustrated in the drawings and are to be now described in relative detail that this is merely by way of example of various types of boxes or cartons that may be set up and are not to be regarded as the only boxes erectable on the present machine.

Specifically, and referring to Figs. 28, 29 and 30, the box there illustrated is formed of a single blank and comprises a bottom panel 35 having its edges defined by score or fold lines 36, 37, 38 and 39. For purposes of description the score or fold lines 37 and 39 may be regarded as the carton sides and each score or fold line integrally hingedly connects with the bottom panel a similar extension 40 which forms the carton side walls, as presently will be made clear. The remaining score or fold lines 36 and 38 may be regarded as the ends of the carton and respectively integrally hingedly connects with the carton bottom 35 an extension 41, which in the erected carton forms the end walls thereof.

The side wall extensions are substantially identical, wherefore it is deemed sufficient if but one of them be described in detail. Accordingly, the extension 40 is provided between its hinge or fold line 39, with the bottom panel, and its outer end, with parallel score or fold lines 42, 43 and 44 for providing in the said extension, panels 45, 46, 47 and 48. The panel 45 has its ends defined by score or fold lines 49 and the panel in the erected carton forms the side wall outer wall member. The panel 46 has its ends defined by cut lines 50 in alignment with the score or fold lines 49 and said panel 46 forms in the erected carton the side wall top wall member. The panel 47 has its ends defined by score or fold lines 51 which are in alignment with the cut lines 50 and the said panel 47 in the erected carton forms the side wall inner wall member. The panel 49 is of a length substantially equal to the length of the side wall inner wall member or panel 47 and in the erected carton constitutes a glue flap for hingedly securing the lower edge of the inner wall member or panel 47 to the bottom panel 35.

The side wall members, respectively, through their end scores 49 and 51 have integrally hingedly connected therewith tucking flaps 52 and 53. The tucking flaps 52 and 53 at each end of each side wall has intermediate them a tucking flap panel 54, normally of a width substantially equal to the width of the top wall or panel 46, with its inner end 55 spaced from the cut end 50 of the side wall top wall member or panel 46. The tucking flap panel 54 is provided with a projecting tongue or lug 56 that is cut from the tucking flap 53 thereby supplying the said panel 54 with a width essentially greater than the side wall top wall member or panel 46. The tucking flap 53 has its inner end defined by a score or fold line 57 thereby providing a hinge panel 58 between the said tucking flap 53 and end of the side wall inner wall member 51.

The end walls extensions being substantially identical it is deemed sufficient if but one of them be described in detail, and accordingly, said extension is provided between its score or fold line with the bottom panel and the outer end thereof with parallel score or fold lines 59, 60 and 61 thereby forming in said extension panels 62, 63, 64 and 65. The panels 62 and 63 each have a length substantially equal to the width of the bottom panel 35 and in the erected carton form the end wall outer wall member and end wall top wall member. The panel 64 has a length shorter than panels 62 and 63 since it is to be disposed between the side walls inner wall members when erected. The panel 64 has outwardly projecting from its outer corners, locking lugs 66 which cooperate with slits or slots 67 formed in the side walls inner wall members or panels 47. The remaining end wall extension panel 65 constitutes a spacer flap for spacing the lower end of the end wall inner wall member from the outer wall member 62, a distance substantially equal to the width of the end wall top wall member or panel 63.

It will be noted that the side walls top wall members or panels 46 are of less width than the end wall top wall members or panels 63 wherefore the erected carton has end walls of greater width than side walls as clearly illustrated in Fig. 30. It is for this reason that the tucking flaps top panels 54 are provided with the projecting lug 56 which establishes the width of the end walls. Cooperating with said end walls spacer lugs 56 the side walls top wall members are each provided with a lug 68 which is cut from the inner wall member to project, upon erection of the box or carton, into the carton with their edges in alignment with the said spacer lug 56 for spacing the ends of the end walls inner wall members from the outer wall members and to provide a means on which the setting up machine may fold the end wall inner wall members in positioning the same.

After the blank has been cut and scored in accordance with the lower side wall extension and end wall flaps as illustrated in Fig. 28, adhesive is applied to the glue flap 48 and the extensions 40 respectively folded on the score or fold line 42 to bring said extensions to the position illustrated for the upper extension in said Fig. 28. The side wall extensions 40 are now each in the position illustrated in Fig. 29. It is in this position that the knocked-down blanks are supplied to the setting-up machine, as illustrated for example in Figs. 1 and 22.

The box and blank illustrated in Figs. 31, 32 and 33, as noted above, differs from that just described principally in that its side and end walls are of double thickness and not of spaced apart inner and outer wall members. In addition, the said box or carton is provided with a slightly different locking means for holding the erected side and end walls in operative positions.

Briefly and specifically, the box in Figs. 31, 32 and 33 comprises a bottom panel 35 bounded by score or fold lines 36, 37, 38 and 39 respectively, constituting the sides and ends of said bottom panel and integrally hingedly connecting therewith side wall extensions 40' and wall extensions 41'.

The extensions 40' are each provided with a longitudinal score or fold line 69 thereby providing side walls outer wall members or panels 70 and inner wall members or panels 71. The inner wall members or panels 71 each has its ends, in part, defined by a score or fold line 72 and in part by an angular or bias cut line 73. Each score or fold line 72 integrally hingedly connects with the panel 71 a tucking flap 74 while each angular or bias cut line 73 constitutes a portion of the wall locking mechanism as will be presently made clear.

The end wall extensions 41' are each provided with a pair of parallel score or fold lines 75 and 76 thereby providing end walls each having an outer wall member or panel 77 and an inner wall member or panel 78 together with a terminal panel or creeper flap 79. Each of the end walls inner wall members or panels 78 has a portion of each of its ends defined by a score or fold line 80 for integrally hingedly connecting therewith a locking lug 81. As will be seen, the locking lugs are each triangular shaped for cooperation with the angular or bias cut 73 of the side walls inner wall members in locking the box in its erected condition.

The end walls outer wall members and the side walls outer wall members each has its ends defined by a score or fold line through which they are connected through a corner piece 82 which is provided with a diagonal score or fold line 83. The corner pieces 82 are each adapted to be folded on the diagonal score or fold line 83 in a bellowwise fashion and are therefore known in the trade as "bellows corners."

After the blank has been cut and scored as just described, adhesive is applied to the exposed surface, as in Fig. 31, of the side wall inner wall member or panel 71 whereupon the said panel is folded on the score or fold line 69 into engagement with the panel or side wall inner wall member 70. The knocked-down blank is now in the condition as illustrated in Fig. 32 and it is in this condition that it is supplied to the setting-up machine for erection.

As will be obvious from Fig. 33, the setting up of the box side walls results in a triangular cut-away portion at the lower corners of the inner wall members and that the setting up of the end walls disposes the triangular locking lugs 81 into said triangular cut-away portions, thereby locking the parts in their erected positions. It should be noted that the insertion of the triangular locking lugs 81 is in reality a snap action since the said locking lugs tend to assume their normal outward positions.

The mechanism for setting up the knocked-down box blank, that is, positioning the side walls, end walls and tucking flaps with respect to the bottom panel, comprises a bed 85 from the four corners of which upwardly project corner posts 86, 87, 88 and 89. The bed 85 may take any suitable or desirable form, that shown in the drawings being formed from a rectangular sheet of metal with the four sides thereof downwardly bent to form flanges each having its end edge secured to the adjusting end edge of the adjacent flange. Intermediate the length of the bed 85, it is provided with additional upstanding posts 90 and 91.

The posts 90 and 91 and the right hand posts 85 and 86 support between them the knocked-down blank magazine or supply indicated in general by the reference numeral 92.

The intermediate posts 90 and 91, in addition, support the knocked-down blank transfer mechanism indicated in its entirety by the reference numeral 93, while the left hand posts 88 and 89 support for operation the erected box discharge mechanism, indicated in its entirety by the reference numeral 94.

The end and intermediate posts 85—91 between them support a shelf 95 which, similar to the bed 85, may take any suitable or desirable form, but preferably is formed from a rectangular sheet of metal having its ends and sides downwardly turned for strength and rigidity and for attachment to the said corner and intermediate posts 86—91. The shelf 95 at a point substantially midway between the transfer mechanism 93 and discharge mechanism 94, supports the box set up mechanism, per se, indicated in its entirety by the reference numeral 96.

The magazine or knocked-down blank supply and feeding mechanism comprises a pair of longitudinal members 97 and 98 preferably in the form of angle irons, each having its inner end respectively secured to one of the intermediate posts and having its outer end respectively secured to one of the corner posts 86 and 87. It will be noted from Fig. 1 that the angle irons 97 and 98 are downwardly inclined from the right hand end of the machine, as seen in Figs. 1 and 2, toward the center thereof. Disposed on each of the angle irons 97 and 98 is a rectangular supporting plate 99 and 100 which, per se, support the magazine proper.

The magazine proper comprises a pair of elongated bars 101 and 102 each having its inner end welded or otherwise secured to a forward transverse brace 103, and said bars 101 and 102 each has its other or outer end welded or otherwise secured to a rear transverse brace 104. The transverse braces 103 and 104 may take any suitable or desirable form, preferably, however, they are in the form of channel irons, as illustrated in the drawings.

Secured to each of said longitudinal members 101 and 102, which are in effect cylindrical bars, to depend therefrom are supports or legs 105 and 106. Each of the supports or legs 105 and 106 is provided at its lower end with an adjustable or extensible mounting pin 107 adapted to be disposed in a suitable aperture 108 in the rectangular supporting plates 99 and 100. It should be here noted that the legs or supports 105 and 106 are adjustable lengthwise of the bars 101 and 102 and since the mounting pins 107, at the ends of said legs, are outwardly adjustable, the said magazine is adjustable with respect to the machine and in order to properly position the knocked-down blanks of the magazine with respect to the transfer head, all of which will be obvious hereinafter.

Upstanding from one end of the upper side of the transverse brace 103, as seen in Fig. 2, are posts 109 and 110, while upstanding from the other end of said transverse brace are posts 111 and 112. Similarly the transverse brace 104 has upstanding from one end of its upper side, again as seen in Fig. 2, a pair of posts 113 and 114 while the other end of said transverse brace 104 has upstanding therefrom posts 115 and 116. Each of the posts has its upper end turned inwardly as seen most clearly in Fig.

22 with the inner ends of the posts 109 and 113 having secured thereto a longitudinal bar 117 and with the similar ends of posts 112 and 116 having secured thereto a longitudinal bar 118 which is parallel with but laterally spaced from the bar 117. The ends of the posts 110 and 114 carry between them a longitudinal bar 119 which is parallel with the bar 117 but in a plane below that of said bar 117. The ends of the posts 111 and 115 carry between them a longitudinal bar 120 which is in the plane of the bar 119 but spaced below the plane of the bar 118. Each of the bars 117–120 is provided at its end that projects ahead of the posts 109–112 with an enlarged head 121 and which head constitutes or forms a stop for the supply of knocked-down blanks in the magazine.

Secured to the forward transverse brace 103 and rearwardly projecting from points intermediate the bars 102 are bars 122 and 123 which constitute or form a trackway for the backup and feed plate for the knocked-down blank supply. The backup and feed plate is indicated in general by the reference numeral 124 and comprises a plate member 125 of an area closely resembling that of the bottom panel of the knocked-down blank, for example, the knocked-down blank of the carton or box illustrated in Figs. 30, 31 and 32 and indicated in Figs. 1, 2, 22 and 23 by the reference numeral 126. The backup and feed plate 125 has depending from it arms 127 and 128 carrying at their lower end a transverse brace 129. The transverse brace 129 is provided with suitable antifriction sliding bearings 130 and 131 which are mounted on and receive the trackway bars 122 and 123.

As will be seen from Fig. 1, the said trackway bars 122 and 123 upwardly incline the same as the magazine wherefore the backup and feed plate 124 descends by gravity toward the center of the machine and its transfer mechanism 93 for thereby maintaining the supply of knocked-down blanks 126 at their inner end of the magazine and maintain the innermost knocked-down blank against the enlargements 121 of the supporting bars 117–120. As will be seen from Fig. 22, the said magazine supporting bars 117–120 are disposed in the corners of the knocked-down blanks where the side and end walls extensions outwardly project from the knocked-down blank center panel.

It should be noted that the posts 109–116, together with their knocked-down blank supporting bars 117–120 are readily removable from the transverse braces 103 and 104 for replacement by other and similar posts and supporting bars for adapting the magazine for knocked-down blanks of different sizes and configuration not specifically limited in Figs. 31–33 as for example, for accommodating the knocked-down blank illustrated in Figs. 28–30.

The backup and feed plate 124 is adapted to be rendered inoperative during the time that the magazine is being loaded and any suitable or desirable means may be employed for this purpose. The means illustrated in the drawings comprises a stud 132 rearwardly projecting from the backup and feed plate brace 129 with said stud having at its outer end a tapered head 132′ with a vertical shoulder 133 immediately forwardly of said head. Secured to the magazine supporting transverse brace 104 at a point, in line with the stud 102, is a spring pressed latch 134 disposed in a suitable housing 135 with said latch having integral therewith or secured thereto, an actuating knob 136.

It is believed that the operation of the foregoing mechanism is obvious from the drawings since a manual retraction of the backup and feed plate 124 to the upper or outer end of the magazine will cause the stud 132 to have its head 132′ depress the latch 134 and snap behind the shoulder 133 for retaining the same in a fully retracted position. Upon a loading or reloading of the magazine with box blanks 125, the latch 134 is released, whereupon the said backup and feed plate will remove by gravity on the trackway bars 122 and 123 to the position for engagement with the knocked-down blank supply and will continuously feed said knocked-down blanks to the forward end of the magazine as fast as they are removed by the transfer mechanism.

As was noted above the shelf 95 supports the box setting up mechanism which is to the left of the knocked-down blank supply or magazine, as seen in Fig. 1, while the transfer mechanism is located between the said setting up mechanism and magazine and is carried by the intermediate uprights 90 and 91 above the box setting-up mechanism. The said box transfer mechanism 93 comprises a driving shaft 137, illustrated most clearly in Figs. 3 and 4 and journaled in bearings 138 carried by and depending from the setting up mechanism supporting shelf or bracket 95. The shaft 137 is held against axial movement relative to the bearings 138 by any suitable or desirable means and has keyed or otherwise secured thereto at a point, preferably intermediate the bearings 138, a sprocket 139. The sprocket 139, see Fig. 5, has extending therearound a sprocket chain 140 which in turn extends around a sprocket 141 keyed or otherwise secured to an oscillatable shaft 142 which forms the actuating shaft of the transfer mechanism and is clearly illustrated in Fig. 4. The sprocket chain 140, after passing around sprocket 139, has its one end 143 connected, through a stud 144 to a finger 145 and said sprocket chain 140, after passing around sprocket 141, has its other end 146 connected, through a stud 147, to a finger 148. The fingers 145 and 148 are secured to and laterally project from a reciprocating frame 149. The reciprocating frame 149 and its fingers 145 and 148 through the sprocket chain 140 and sprockets 139 and 141 form, in effect, a reciprocating flexible rack for actuating the drive shaft and oscillating the actuating shaft of the transfer mechanism.

The mechanism for actuating the reciprocating frame 149 may take any suitable or desirable form, that shown in the drawings being in the form of, what may be termed, a cross-head since it is operated by a crank, and which cross-head is indicated in its entirety by the reference numeral 150. The cross-head comprises a pair of guide posts 151 and 152 upstanding from the bed 85 and on each of which posts is mounted a sleeve 153 and 154. The sleeves are each provided interiorly with anti-friction bearings 155 and said sleeves are connected with one another by means of a front strap plate 156 and a rear strap plate 157. The sleeves 153 and 154 together with the strap plates 156 and 157 constitute the reciprocating cross-head 150 and is guided by the posts 151 and 152. It is to this cross-head that the reciprocating frame 149 is connected through the agency of the frame uprights or longitudinal members 158 and 159.

The cross-head 150 substantially midway of its length is provided with a pin 160 on which is journaled the upper end of a connecting rod 161. The lower end of the connecting rod 161 is journaled to a crank pin 162 outwradly projecting from a crank arm 163. The crank arm 163 is keyed or otherwise secured to shaft 164 projecting from one side of a speed reducer 165. The speed reducer 165 may, and in effect does, constitute a crank shaft for operating the cross-head. The speed reducer 165, crank shaft, has connected therewith a pulley 166 actuated through a belt 167 from a suitable source of motive power, an electric motor, disposed on the bed 85, as illustrated in Fig. 1.

The transistor mechanism 93 is operable from a position ahead of the magazine or supply 92, where it picks up the front or innermost box blank, to a position over the box folding mechanism, indicated in general, as noted above, in Fig. 1 by the reference numeral 96. The transfer mechanism is provided at each of the outer ends of its actuating shaft 142 with an arm 168 and 169. The shaft 142 is oscillatable in suitable bearings or journals 170 carried by the upstanding intermediate posts 90 and 91 and it is beyond these bearings that the arms 168 and 169 are secured to the shaft 142. Loosely mounted on one end of the oscillatable shaft 142 is a hub 171 having projecting from diametrical points arms 172 and 173 and which hub is held against rotation by a linkage mechanism clearly illustrated in Figs. 1, 6 and 7 and which linkage mechanism controls the position of the pickup head, particularly, at each end of its cycle of movement, and which pickup head is indicated in its entirety by the reference numeral 174.

It will be obvious that vertical reciprocation of the frame 149 through the sprocket chain 140 effects rotary or oscillatory movement of the shaft 142. Since the arms 168 and 169, as will presently be made clear, carry the transfer head mechanism which has some weight, the oscillation of the actuating shaft 142 is counter-balanced by springs 175 which have their one ends anchored to a stud 176 projecting from the upstanding intermediate post 90 with said springs having their other ends secured to the outer end of a finger 177 projecting from a collar 178 keyed or otherwise secured to the said actuating shaft 142, all as clearly illustrated in Figs. 4 and 5.

Carried by the outer ends of the arms 168 and 169 is the transfer head mechanism indicated, as noted above, in general, by the reference numeral 180, and which transfer head mechanism comprises a shaft 179 on which is mounted the transfer head, per se. The transfer or pickup head 180 is adapted to be oscillated relative to the shaft 179 wherefore the shaft 179 has oscillatably journaled thereon a sleeve 181 extending from one of the arms, arm 168, for example, to the said head 180 where the said sleeve 181 is secured to head block 182. The sleeve 181 adjacent the arm 168 has secured thereto a sprocket 183 which is in line with the hub 171 on the actuating shaft 142. Extending about said sprocket 183 is a sprocket chain 184 which extends toward the hub 171 for connection with the hub arms 172 and 173.

The connection of the sprocket chain 184 with the hub arms 172 and 173 is by way of a stud 185 at one end 186 of said chain, with hub arm 172 and the other end 187 of the sprocket chain 184 is through a stud 188, an expansible connector 189 and a stud 190, with the hub arm 172. As will be seen in Figs. 2 and 6, the stud connectors 185 and 190 are respectively integral with or suitably connected to a pivot member 191 and 192 and through which the said ends 186 and 187 of the sprocket chain 184 are pivotally connected through pivots 193 and 194 to said hub arms 172 and 173.

The hub arm 172 constitutes a part of the linkage mechanism which effects rotation of the hub 171, and in fact effects a rotation or oscillation of the transfer head with respect to its carrying shaft 179.

The said linkage comprises a clevis 195 pivotally carried by the lower end of hub arm 172 with said clevis having its other end connected to an expansible connector 196. The other end of the expansible connector 196 is connected with a second clevis 197 pivoted at 198 to a finger 199 offset from an arm 200. The arm 200 and its finger 199 bear the relationship of a U-shaped construction 201 at one end of said arm.

The arm 200 is pivoted intermediate its ends to an upstanding bracket 202 connected to intermediate post 91 by a spacer 203 and located on said post at a point just upwardly of the shelf or bracket 95. The other or inner end of the arm 200 has pivotally connected thereto through a pivot pin 204 a clevis 205 which is similar in all respects to the clevis 197. The clevis 205 has connected with its other end a compressible connector or link 206 which is similar in all respects to the said connector or link 189 in the sprocket chain 184. The other end of the compressible connector or link 206 is connected with a clevis 207 in turn pivotally connected through pivot pin 208 with a lug 209 carried by and depending from transfer mechanism arm 168.

The compressible connectors or links 189 and 206 may take any suitable or desirable form, that shown in Fig. 6 comprising a cylindrical housing 210 closed at one end as at 211 and having threaded therein the stud 212 of the clevis 207. The housing 210 encloses a spring 213 having one end in abutment with the closed end 211 and having its other end in abutment with a piston 214 interiorly of said sleeve 206 and carried by the stud 215 of the clevis 205.

From the foregoing, it will be noted that the arm 168 may be actuated toward the arm 200 if said arm 200 is held against movement. Whereupon the spring 213 would be compressed. It should be noted that the expansible coupling or connector 196 operates in a similar, though reversed, manner and has its spring compressed upon the movement of the hub arm 172 toward the finger 199 when said finger 199 is held against movement.

The linkage arrangement and particularly the arm 200 is held against free movement for which purpose the pivot shaft 216, see Fig. 7, of the arm 200 is held against rotative movement between the bracket 202 and intermediate post 91 and the said pivot shaft 216 has keyed thereto a clutch or brake member 217 yieldably actuated by a spring 218 toward the said arm 200. The arm 200 has secured to it through a sleeve 219 a complementary clutch or brake member 220 and carries on its face a suitable clutch or brake lining 221 for engagement with the clutch or brake member 217.

From the foregoing, it will be readily noted that the arm 200 is not free to oscillate on its pivot shaft but can oscillate under force substantial enough to overcome the brake tension exerted by the spring 218 on the brake lining 221.

It will be understood that since the arms 168 and 169 are secured to the actuating shaft 142, they oscillate with said shaft 142 and that through the linkage the hub 171 and its arms are actuated or oscillated independently of and while moving with said shaft and that the said linkage effects said hub oscillation at various rates as follows:

The upward movement of the arms 168 and 169, as seen in Fig. 6, through the link between the arm 168 and the arm 200 and including the compressible connector 206, oscillates the said arm 200 in a clockwise direction and through the link between the finger 199 and the hub arm 172 and including the compressible connector 196 actuates the hub 171 and its arms 172 and 173 in a counter-clockwise direction. This actuation of the hub 171 is in effect a holding of said hub against any movement. This movement of the hub 171 correspondingly moves the sprocket chain 184 and actuates or oscillates the sleeve 181 and transfer head 180 in a counter-clockwise direction even though the transfer head shaft 179 moves with the outer ends of the arms 168 and 169 and carries with it the sprocket 183. This movement of said sprocket 183 is effected by, in effect, rolling thereof within the sprocket chain for correspondingly actuating the sleeve 181 and the transfer head 180. By this construction the transfer head 180 is caused to rotate or oscillate on the shaft 179 and at one end of its stroke to have a position wherein its axis is aligned with the axis of the setup mechanism 96 and when at the other end of its stroke the said transfer head axis is aligned with the axis of the magazine supply of knocked-down box blanks.

Due to the rotary or oscillatory movement of the transfer head with respect to both, the box setting-up mechanism and box blank supply magazine, the said transfer head axis is aligned with the setup mechanism axis and the magazine axis prior to actual contact of the transfer head with said mechanisms; wherefore, it is necessary that independent oscillation of the transfer head at each end of its transfer stroke be stopped and the said head moved through a path which maintains the aforementioned alignment of the axes.

Continuing with the operation of the transfer mechanism, and the upward movement of the transfer mechanism arms 168 and 169 until the said transfer head axis and magazine axis are aligned. This, as noted above, occurs prior to contact of the transfer head with the knocked-down box blank, and at this time the lower surface 222 of the arm 200 engages with the upper corner 202' of the bracket spacer 203 for thereby arresting further oscillation of the said arm 200 but not arresting the oscillation of the actuating shaft 142. This arresting of further movement of the arm 200 prevents limits and in effect stop further rotation or oscillation of the hub 171, hub arms 172 and 173 and movement of the sprocket chain 184.

It will be noted that the attachment of the ends of the sprocket chain 184 with the hub arms 172 and 173 is at wider points than the diameter of the sprocket 183, wherefore, the actuation or oscillation of said hub 171, through the sprocket chain 184, causes the sprocket 183 and parts connected therewith to oscillate through a greater angular arc than that traveled by the said hub 171 and its arms 172 and 173. This arrangement of parts is what causes the transfer head to swing through an independent arc while also traveling through the arc of and with its supporting shaft 179 as effected by the arms 168 and 169. The arresting of the movement of the arm 200 by the bracket brace 203 has the effect of stopping the movement or oscillation of the hub 171 and its arms 172 and 173 and therefore stops the movement of the sprocket chain 184. This holding of the sprocket chain 184 and the continued movement of the arms 168 and 169 together with the movement of the shaft 179 causes the sprocket 183 and parts actuated thereby to be held against independent movement or oscillation and maintains the axis of the transfer head in a plane at a given angle to the axis of the carrying shaft 179 even though the said shaft continues to move with the arms 168 and 169 and, in effect, rotates within the sleeve 181 and transfer head 180. Therefore, the transfer head, actually the sleeve 181 mounted on the shaft 179, is prevented from further oscillation and wherefore the transfer head is moved in the direction of the axis of the magazine even though the transfer head shaft continues in its arced movement. The tendency of the hub 171 and the arms 172 and 173 to continue to move with the arm 168 is taken up by the extensible link or coupling 189 which forms a part of the sprocket chain 184.

At this time, the transfer head picks up the innermost knocked-down box blank as will later be made clear. Whereupon the transfer mechanism actuation is reversed. The first movement of the parts is through the extensible coupling 189 for withdrawing the transfer head directly from the magazine. Whereupon the parts are in position for oscillating the said transfer head to a position for eventual alignment with the set-up box mechanism.

As was noted above, the oscillation of the transfer head must be arrested and controlled upon the alignment of its axis with the axis through the set-up mechanism and which operation is effected through the arresting of the movement of the arm 200 in a manner quite similar to that above described. Specifically, the bracket spacer 203 has connected thereto, to project laterally thereof an arm 223 on which is positioned an abutment 224 for engagement with the undersurface 222 of the arm 200 as the arm moves in a counterclockwise direction. Upon engagement of the arm 200 with the abutment 224, the linkage mechanism is held against movement while the transfer arms 168 and 169 continues in a counterclockwise direction, the movement of the parts is taken up by the compressive coupling or link 206.

From the foregoing, it will now be understood that the transfer mechanism transfers successive knocked-down box blanks from the magazine to the box setting-up mechanism and actually positions the same with respect to the operating elements of the box set-up mechanism as will subsequently be made clear.

The transfer head 180, in addition to the block 182, has a plate 225 connected with said block by means of pins 226 and 227 which are slidably mounted in the block 182. Encircling each of the pins 226 and 227 is a spring, respectively 228 and 229, each abutting on its lower end with the plate 225 and on its upper end with the block 182. To prevent disassociation of the parts the said pins 226 and 227 are each provided at its upper end with an enlarged head, respectively 230 and 231, disposed in counter-sinks 232 and 233. The plate 225 has an effective area substantially equal to the area of a box bottom panel, box bottom panel 35, for example and the knocked-down carton supply or magazine is positioned with respect to the machine so that the plate 225 is disposed accurately with respect to the said bottom panel of the innermost blank. In order that the said transfer head 180 through its plate 225 will pick up the blank there is provided a pneumatic suction device on the said transfer head.

The pneumatic suction device may take any suitable or desirable form, that illustrated in the drawings comprising, as seen in Fig. 8, adjacent the opposite ends of the plate 225, a suction cup 234 and 235 each carried by a flexible carrier, respectively indicated in its entirety by reference numerals 236 and 237. It will be appreciated that the transfer head is pushed against the innermost blank of the supply with considerable force to make sure that the blank and transfer head are connected with one another and since the said supply is relatively non-yieldable, the yieldable connection between the plate 225 and block 182 is provided by the springs 228 and 229 and a yieldable connection is likewise provided in the suction cup carrier mechanisms 236 and 237.

In practice, the suction cups 234 and 235 are connected with a pneumatic or suction pump, wherefore the suction cup 234 has extending from it a flexible conduit 238 while the suction cup 235 has extending from it a similar flexible conduit 239. The flexible conduits 238 and 239 each terminate in a port or duct 240 in the transfer head block 182, with said duct 240 having connected therewith one end of a flexible conduit 241 which has its other end connected to a pneumatic control valve, indicated in its entirety by the reference numeral 242, see Fig. 4.

The control valve 242 contains a piston type valve 243 movable to two operative positions for alternately connecting the pneumatic suction pump with the transfer head or with the box forming mechanism and which valve will be subsequently described in detail. It should be here noted, and as will presently be made clear, the suction pump when connected with the transfer head is simultaneously connected with a discharge head.

As was noted above, the transfer mechanism 93 and particularly the transfer head 180, transfers a knocked-down blank from the magazine or supply to the setting-up mechanism 96. The setting up mechanism, as noted above, is supported on the shelf or bracket 95 carried by the corner and intermediate upright posts 86—91. Upstanding from said bracket or shelf 95 and supporting the operating elements for the end walls of the box, are opposed pairs of pillars 244 and 245 respectively supporting similar operating elements which respectively set up a box end wall, said mechanisms being respectively indicated, in general, by reference numerals 246 and 247. Since said box end walls setting up mechanisms are substantially identical in construction and operation it is deemed sufficient if but one of them be described in detail.

The mechanism 246 has its pillars 244 disposed on the upper surface of a plate 249 and secured thereto as by welding and which plate 249 is in turn secured to a base plate 250 removably secured to and carried by the shelf or bracket 95. The removable base plate 250 is secured to the shelf or bracket 95 by readily operable toggle clamps 251 and 252 at each end thereof and which clamps will be described in detail.

The pillars 246 are provided with aligned apertures in which is disposed a shaft 253 to have oscillatably mounted thereon, between the pillars, a sleeve 254. Secured to the sleeve 254 is a tang or tongue 255 that is located between the pillars 246 to extend thereabove and has secured thereto the element which effects the raising or positioning of its box end wall. This element conveniently takes the form of a plate 256 of a length substantially equal to the length of the box end wall, particularly the end wall outer wall member, and the said plate has outwardly projecting from its upper end a ledge or finger 257. The plate 256 has a height, below the finger 257, that is substantially equal to the height of the box end wall, particularly the box end wall outer wall member.

Disposed on the pillars 246 and 247 is a table 258 on which the knocked-down box blank is disposed by the transfer head. The said knocked-down box is retained on the table 258 through any suitable or desirable means, preferably through a suction cup 258 which is substantially identical with the suction cups of the transfer head, wherefore, the suction cup 258 is mounted on a flexible carrier 259 from which extends a flexible conduit 260. The flexible conduit 260 has its other end connected with the valve mechanism 242.

Each of the box end wall raising mechanisms has projecting from its tang or tongue a furcated ear 261 having a pivotal connection with one end of an adjustable link 262. The adjustable link 262, see Fig. 14, comprises a rocker stud or shaft 263 having substantially midway of its length a threaded aperture 264 through which is threaded a rod 265 having at its other end an eye 266. The eye 266 is rotatably mounted on pivot pin 267 carried by the furcated upper end 268 of an oscillatable arm 269. The arm 269 is pivoted at its lower end by pivot 270 between the lower ends of pillars 246.

Intermediate its end, the arm 269 carries a cam follower in the form of a roller 271 disposed in a cam track 272 formed within the borders of a cam plate 273.

It should be noted that the knocked-down box blank end wall operating mechanism for the other end walls includes a cam plate 274 which has its cam track of an opposite hand from that of cam plate 273.

The setting-up or erecting mechanism for the side walls of the box is similar to that above described for the end walls, there being a separate mechanism for each side wall, respectively indicated by reference numerals 275 and 276. Each of said side wall erecting mechanisms 275 and 276 includes a pair of pillars 277 and 278 and since the said erecting or setting-up mechanisms are substantially identical, it is deemed sufficient if but one of them be described in detail.

Accordingly, the side wall setting up or erecting mechanism 276, for example, comprises a shaft 279 carried by the pillars 278, at the upper ends thereof to have oscillatably mounted thereon, between the pillars, sleeve 280. The sleeve 280 has secured thereto a tongue or tang 281 to extend there-above and the said tongue or tang 281 has secured thereto the element which effects the raising or positioning of the box side wall. This element conveniently takes the form of a plate 282 of a length substantially equal to the length of the box side wall, particularly the side wall outer wall member, and the said plate has outwardly projecting from its upper end a ledge or finger 283. The plate 282 has a height, below the finger 283, that is substantially equal to the height of the box side wall, particularly the box side wall outer wall member.

The pillars 277 and 278 similar to the pillars 246 and 247 and in cooperation with said last named pillars, supports the table 258 on which the knocked-down box blank is disposed by the transfer head.

Each of the box side wall raising mechanisms has projecting from its tang or tongue a furcated ear 284 having a pivotal connection with one end of an adjustable link 285 which is similar in all respects to the adjustable link 262, above described and clearly disclosed in Fig. 14, the description of which may be referred to for the specific construction of the said link 285. The link 285 is connected with the furcated upper end 286 of an arm 287 pivotally mounted at 288 to the lower end of the pillars 289.

The arm 287 carries intermediate its ends, a cam follower or roller 290 disposed in a cam track 291 formed intermediate the borders of a cam plate 292. The box side raising or erecting mechanism 275 utilizes a similar cam plate 293 but has its cam track of an opposite hand to that in the cam plate 292.

The cam plates 273, 274, 292 and 293 are secured to the upper end of a vertically reciprocating ram 294 which has its upper portion formed to have an angular or square cross section and thereby provide seats 295, 296, 297 and 298, respectively for each of the said cam plates 273, 274, 292 and 293. The cam plates are each secured to its respective seat by a similar clamp bolt 299 which extends through its cam plate into the ram 294. In addition the said cam plates 273, 274, 292 and 293 are secured as a group between a clamp plate 300 at the upper end of the ram 294 and a shoulder 301 on the ram at the bottom of each cam plate seat. The ram 294 is removably secured to a ramrod 302, carried by a crosshead mechanism indicated in its entirety by the reference numeral 303 and which crosshead is similar to the transfer mechanism crosshead 150. The separable or removable connection between the ram 294 and ram rod 302 make take any suitable or desirable form that is shown in the drawings comprising a sleeve or socket member 304 secured in the lower end of the ram 294. The sleeve or socket member 304 has formed therein, at diametrically opposite points, a bayonet slot 305, see Fig. 11, which cooperates with the projecting ends of a transverse pin 306 at the upper end of the ramrod 302. The operation of a bayonet joint is believed well understood and further description here is believed unnecessary.

The crosshead mechanism 303 comprises upstanding guide posts 307 and 308 extending between the bed 85 and the shelf or bracket 95 and on which guide posts are respectively disposed sleeves 309 and 310. The guide sleeves 309 and 310, similar to the guide sleeves 153 and 154, are each provided interiorly thereof with an anti-friction bearing 311 and said guide sleeves are connected with one another by a front strap plate 312 and a back strap plate 313, see Fig. 3. A connecting rod 314 has its upper end pivotally connected through a pin 315 with and between the crosshead plates 312 and 313 with said connecting rod 314 having its lower end journaled on a crank pin 316 projecting from a crank 317. The crank 317 has its other end keyed or otherwise secured to the output shaft or crank shaft 164 of the speed reducer 165.

Secured and upwardly extending from the crosshead connecting plates 312 and 313 is a pair of relatively short uprights 318 and 319 joined to one another by a cross tie 320 to which the lower end of the ramrod 302 is secured.

In practice, the cam plates 273, 274, 292 and 293 are vertically actuated and each through its cam track 272 or 291 operates on its respective cam follower 271 or 290 for oscillating the arms 269 and 287 which through the adjustable links 282 and 295 oscillate the tongues or tangs 255 and 281 for actuating the box walls erecting or raising mechanisms 246, 247, 275 and 276 from the solid line position of the right hand plate to the dotted line position thereof as illustrated in Fig. 10.

As was noted above, the box sides erecting or raising mechanism 96 is carried by a removable base plate 250 which is for the purpose of permitting a replacement of the box raising mechanism so that the machine may be adapted for different size boxes. The toggle clamps 251 and 252 are identical and each comprises a hanger of U-shape including a base member 321 from the ends of which project arms 322. The base 321 is provided with a notch 323 for straddling a depending clamp bolt 324 in an overhanging portion of the plate 250. A clamp lever 325 is disposed within the clamp hanger and is pivotally mounted on a lug 326 outwardly projecting from the shelf or bracket 95 and the said lever 325 has a pivotal connection at 327 with the clamp hanger. An operating finger 328 is secured to the lever 325 for completing the toggle clamp.

It is believed that the operation of the toggle clamp is obvious from Figs. 10 and 16 but briefly consists in operating the lever 325 about its pivotal connection with the lug 326 and which through the pivot 327 raises the clamp hanger base 321 to release the clamp bolt 324. Whereupon the said plate 250 and parts carried thereby are removable from the machine. Obviously, reverse actuation of the clamping lever 325 secures the plate 250 to the shelf or bracket 95.

As disclosed in the samples of boxes to be set up on the present machine, and as described above, the said boxes have at the ends of their side walls, tucking flaps which are to be disposed transversely of the bottom panels and enfolded by the end walls inner and outer wall members. These tucking flaps must be positioned, therefore, before the said end walls are completely erected. Any suitable or desirable means may be employed for positioning said flaps, that shown in the drawings being found adequate and comprising upstanding members at each end of either the side walls or the end walls raising plates 256 or 282. Preferably, the said upstanding members are placed at the ends of the box side walls raising plates 282 and are mounted in position by extending the shaft 279, of each sidewall raising plate to be beyond the ends of said sidewalls raising plates and have secured to each shaft extension a block 329. Each block 329 has an upstanding member, in the form of a finger, 330, secured thereto. By this construction there is an upstanding member or finger 330 at each corner of the box setting-up or erecting mechanism 96 for simultaneously arranging or positioning the tucking flaps at each corner of the box.

The box side and end walls raising mechanisms merely raise the outer wall members to be normal to the box bottom panel which in connection with the said walls automatically positions their inner wall members and top wall members to be respectively normal to and parallel with the bottom panel. The end walls must have their inner wall members folded inwardly of the box or carton. This folding of the end walls inner wall members is initiated by the fingers 257 of the end wall erecting mechanisms 246 and 247. In other words, the portion of the end wall extensions beyond the score or fold lines 59 in the blank illustrated in Fig. 28, and the portions of the end walls beyond the score or fold lines 75 in the blank illustrated in Fig. 31 are substantially immediately actuated toward a horizontal position upon engagement of said end walls extensions by the said folding mechanisms 222 and 223 due to the fact that the said tongues engage said end walls extensions at points just beyond or above said score or fold lines 59 and 75. At this time the mechanism illustrated to the left of the box folding mechanism, in Fig. 1 and indicated in general by the reference numeral 94, is brought into operation as now will be made clear.

The mechanism 94 may be termed the final setup mechanism and discharge mechanism and comprises and is supported by the end or corner posts or uprights 88 and 89. The said mechanism 94, as most clearly illustrated in detail in Figs. 1, 2, 3 and 17 to 21, comprises a shaft 331 oscillatably mounted in bearings 332 and 333 respectively carried by and outwardly projecting from the corner posts or standards 88 and 89. The shaft 331 has keyed or otherwise secured thereto, intermediate its ends, a sprocket 334 about which is trained a sprocket chain 335. The sprocket chain 335 in addition is trained or extends about a second sprocket 336 keyed or otherwise secured to a driving shaft 337. The driving shaft 337 is oscillatably or rotatably mounted in bearings 338 and 339 which downwardly projects from the under surface of the bracket or shelf 96 inwardly from the corner posts or standards 88 and 89.

The shaft 337 is driven in timed relation with the transfer mechanism and is therefore driven from the actuating shaft 137 of the transfer mechanism. Accordingly the shaft 337 is provided intermediate its ends with a sprocket 340 about which is trained a sprocket chain 341 that in turn is trained about a sprocket 342 keyed or otherwise secured to the driving shaft 137.

From the foregoing it will be noted that cross-head mechanism 150 actuates the oscillating shaft of the tranfer mechanism as well as the oscillating shaft of the final setup and discharge mechanism.

The discharge mechanism shaft 331, similar to the transfer mechanism shaft 179 is counter-balanced by a pair of counter-balancing springs 343 which have one end attached to a finger 344 projecting from a collar 345 keyed or otherwise secured to the said shaft 331, and with said springs having their other ends secured to a stud 346 projecting from the corner post or standard 88. The counter-balance is desirable in this instance since the discharge mechanism is in the form of a swinging frame of the order of the frame of the transfer mechanism.

The final setup and discharge mechanism swinging frame comprises a pair of arms 347 and 348 respectively secured to the ends of the oscillating shaft 331 with said arms carrying between their outer ends a shaft 349 on which is mounted the said final setup mechanism and discharge mechanism which is in the form of a head indicated in general by the reference numeral 350.

The mounting of the final setup and discharge head 350 on the shaft 349 is quite similar to the mounting of the transfer head 180 on its supporting shaft and comprises a sleeve 351 loosely mounted on the shaft 349 between one arm, arm 347 for example, and a block 352. The block 352 is secured to the sleeve 351 in any suitable or desirable manner so as to partake of any rotary or oscillatory movement given to said sleeve. The connection of the sleeve 351 and block 352 may be by way of a collar or flange 353 carried by the sleeve 351 and secured to the block 352.

The head 350 is to be maintained in a definite angular position with respect to the shaft 349 during its movement between its final set up position and its discharge position by means somewhat similar to the means which operate on the mounting of the said transfer head 180 except that the final setup and discharge head 350 is not independently oscillated and in fact is held against any movement. This means includes a sprocket 354, see Fig. 17, keyed or otherwise secured to the sleeve 351, and said sprocket has trained thereabout a sprocket chain 355. The sprocket chain 355 is, in turn, trained about a sprocket 356 loosely journaled on the oscillatable shaft 331, see Fig. 39. The sprocket 356 is anchored against movement through an ear 357 depending from the sprocket 356 having connected therewith one end of a pin 358 and which pin 358 has its other end welded or otherwise secured to the adjacent supporting standard 89.

It will be understood that since the arms 347 and 348 are secured to the actuating or oscillatable shaft 331 they oscillate with said shaft 331 and since the sprocket 356 is held against movement the sprocket chain 355 will be caused to travel around the said sprocket 356 and thereby rotate or oscillate the sprocket 354 and the parts connected therewith, such as, the sleeve 351 and the head 350 for maintaining the said head with its axis vertical during the movement thereof between its discharging position and its position for folding inwardly the end walls inner wall members.

The head 350 includes at the lower edge of the block 352 a beam 359 having its opposite ends furcated and respectively having pivotally connected thereto one end of a link 360 and 361. The links 360 and 361 each has its other end respectively pivotally connected with a bracket 362 and 363 inwardly projecting respectively from a plate 364 and 365. The plates 364 and 365 are respectively secured to a sleeve 366 and 367 respectively mounted on a shaft 368 and 369 that extend between depending side plates 370 and 371 at the ends of a carrier plate 372.

The carrier plate 372 is located below the head block 352 being maintained in operative position and association with the block 352 by pins 373 and 374 which are carried by and depend from the block 352. Encircling the pins 373 and 374 are sleeves 375 and 376 which upstand from the plate 372 but stop short of the under surface of the block 352. The sleeves 375 and 376 are for the purpose of limiting the movement of the plate 372 toward the block 352 and performing the function of box wall folding as will subsequently be made clear. In normal operation the plate 372 is yieldably maintained below the block 352 and this position is established by an enlarged head 377, at the upper end of each of the pins 373 and 374 operating in a depression or counter-sink 378 let into the upper end of the block 352. This spacing of the parts is yieldably maintained by expansion coil springs 379 and 380 respectively encircling the pins 373 and 374 and the associated sleeves.

The carrier plate 372 inwardly of each of its end or side plates 370 and 371 has depending therefrom a slide bracket 381 and 382 each having formed therein inwardly of its outer face, a dove tail guide-way 383 and 384. Mounted in each of the said dove tail guideways is a dove tail guide 385 and 386 respectively inwardly projecting from a slide 387 and 388. Each of the slides has rotatably mounted at its lower end a roller 389 and 390, which has been conveniently formed as a roller but need not take this specific form as the functions performed thereby are that of cams rather than rollers as presently will be made clear.

Substantially midway of the length of each side plate 370 and 371 there is provided inwardly projecting pins, there being two pins on each side plate, those for side plate 370 being indicated by reference numerals 391 and 392 while the pins from the side plate 371 are indicated by the reference numerals 393 and 394. Mounted on each of the said pins 391 and 394 is a similar member those on pins 393 and 394 being illustrated in cross-section in Fig. 20. Said members are indicated in the drawings by reference numerals 395, 396, 397 and 398 and each of said members is provided at its upper end with a bored enlargement 399 through which it is mounted on its pin and from which enlargement depends a finger 400 that, in its normal position, terminates at about center of the roller or cam 389 or 390 located therebelow. The members 395 and 396 are yieldingly retained in their normal positions of having their lower ends in contact with the roller or cam 390 by a spring 401 which is substantially U-shaped and has its arms engaging with said members 395 and 396 below their enlargement 399. A similar U-shaped spring 402 is provided for the members 397 and 398. As seen in Fig. 20, the spacing of the upper or enlarged ends 399 of said members is less than the spacing between the out turned lower ends of their body portions. It will be noted that said body portions between their free outer ends and enlargements are outwardly arcuately formed.

The slides 387 and 388 are adapted to be actuated relative to their slide brackets 381 and 382 but this relative movement is limited by a pin and slot connection 403 between the parts as clearly illustrated in said Fig. 20.

The operation of this final erection head is as follows:

After the knocked-down box of Fig. 28 has had its side walls upwardly disposed and its end walls have had their outer wall members similarly upwardly disposed, the portions of the end wall extensions beyond the score or fold line 59 is lying on the side wall top wall members through the agency of the locking lugs 66. The downward movement of the head 350 causes the corners of the slides 387 and 388 to engage with and depress the end walls inner and outer wall members spacing flaps 65 of each end wall extension to a position to downwardly extend with respect to the end walls inner members or panels 64. During the said bending of the spacer flaps the end walls extension panels 64 are retained in position on the side walls top wall members through the locking lugs 66 projecting therefrom.

At this time the head 350 is within the box sufficiently that the plates 364 and 365 are in contact with the inner edge of their respective end wall inner wall member and the said slides 387 and 388 are engaging the bottom panel of the box. Continued downward movement of the head 350 causes the slides 387 and 388 to be actuated upwardly of their slide brackets, or toward the carrier plate 372, and at the same time the rollers or cams 389 and 390 moving upwardly with the slides, as respects the members 395–398 causes them to outwardly oscillate on their pins 391–394 against the resistance of their springs 401 and 402. The members 395–398 are disposed below and, due to their arcuate formation, engage the lower edges of the end walls inner wall members, and, in fact, engage with the spacer flaps for keeping them folded during the positioning of the end walls inner wall members.

When the slides 387 and 389 reach the upper limit of travel as determined by the pin and slot 403, continued downward movement of the head assembly 350, particularly continued downward movement of the block 352, causes the beam 359 through the links 360 and 361 to oscillate the plates 364 and 365 outwardly on their shafts 356 and 357 and thereby force the end walls inner wall members to their operative positions, which is, adjacent to and parallel with the outer wall members. It will be understood that this positioning of the inner wall members is about the score or fold lines 60 and with the top wall members retained in position by the ends thereof resting on the side wall top wall members as well as resting on the spacer lugs 56 and 68 projecting respectively from the spacer flap and side walls inner wall members.

At this time the end walls are completely and fully positioned with their inner wall member locking lugs disposed in the side wall locking slots. The head 350 has reached its lowermost position and is about ready for withdrawal and return to its original position. At this time also, the suction cup 404 carried by a bridging piece 405 between the slide brackets 381 and 382 engages with the bottom panel of the now setup box so that withdrawal of the head 350 carries with it the completed and setup box.

The suction cup 404, similar to the suction cups above referred to and described, is mounted in a flexible carrier 406 at the end of a pipe or conduit 407 which has connected to its upper end a flexible pipe or conduit 408 that terminates in the valve mechanism 242.

Figure 4:
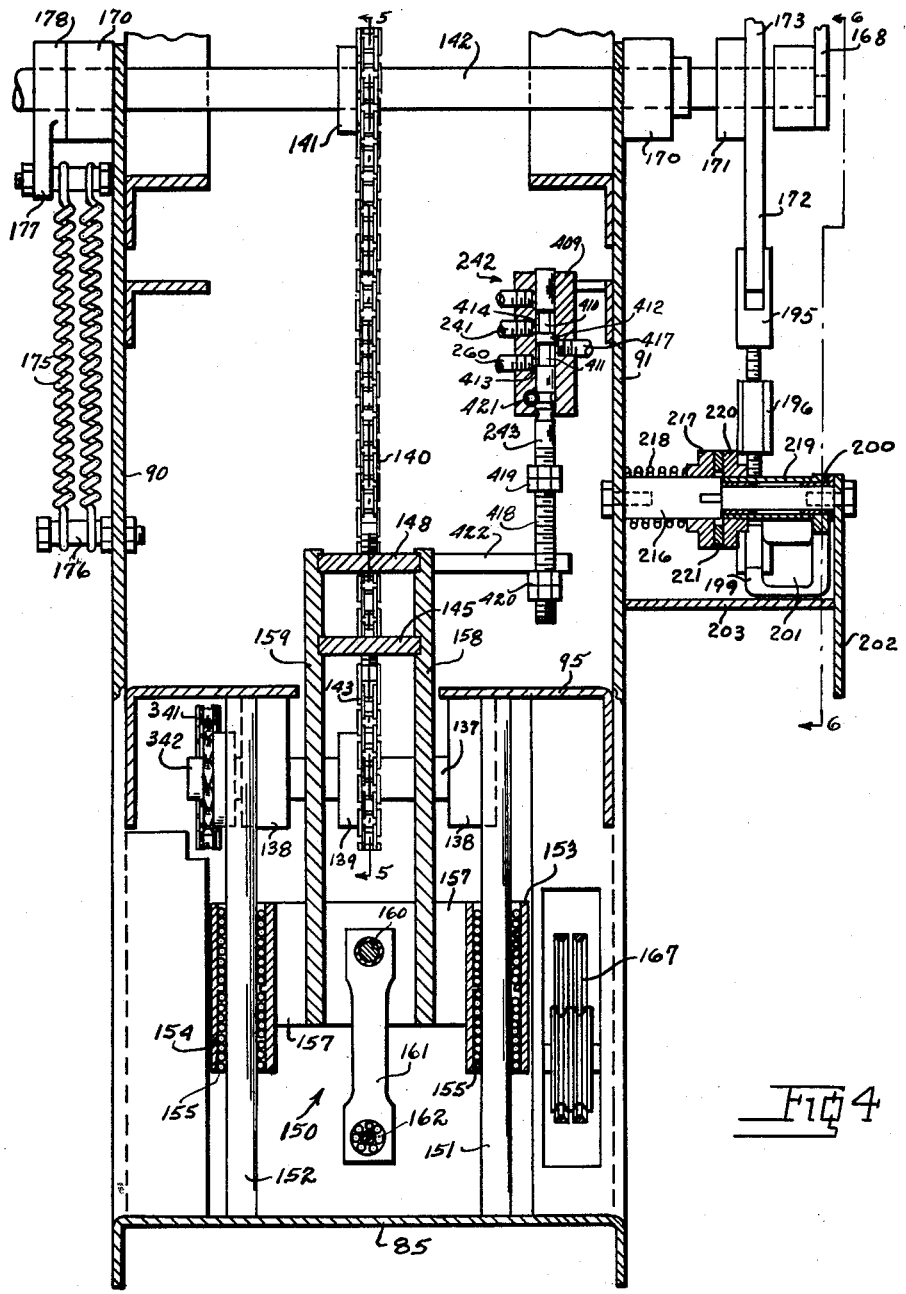
Fig. 4 is an enlarged fragmentary vertical sectional view through a portion of the machine as seen from line 4—4 on Fig. 1.

As was noted above, the valve mechanism 242 is provided with a piston type valve 243 and as will be seen in Fig. 4 the said valve is disposed in a bore in a valve block 409 and has a pair of reduced portions 410 and 411. The valve 243 has two operative positions whereby its reduced portion 410 will connect a port 412 with a port 413 and whereby its reduced portion 411 will connect the said 412 with a port 414. Port 412 is an inlet port and is connected by a conduit 417 with a pneumatic suction pump, while the remaining ports 413 and 414 have respectively connected therewith the flexible conduits from the transfer head and the box forming mechanism table and at the same time the port 413 has connected therewith the final setup head and discharge mechanism. In other words, it is with the port 413 that the other end of flexible conduit 241 connects and it is also with this port 413 that the other end of the flexible conduit 408 connects unless the said flexible conduit 408 is connected directly with the conduit 241, and it is with the port 414 that the other end of the flexible conduit 260 is connected.

The valve 243 is provided with an extension or valve stem 418 conveniently threaded throughout its length to receive stops 419 and 420, conveniently in the form of nuts threaded on the threaded valve stem, through which the valve 243 is shifted to its operative positions. The said operative positions of the valve are determined by a spring operated detent 421 that cooperates with the usual seats formed in the said valve 243. The valve 243 is shifted through a valve shifter 422 secured to and operated by the reciprocating frame 149.

As was noted above, the suction pump is connected with the transfer head at the time of its picking up a knocked-down box and is disconnected therefrom at the time the said knocked-down box is disposed on the setup mechanism table 258, wherefore the valve actuator 422 is mounted on the frame 149 so as to shift the valve as the frame approaches its opposite limits of reciprocation and which is its positions when picking up a knocked-down box from the magazine or supply and the placing thereof on the setup mechanism table.

Any suitable or desirable suction pump may be provided for supplying the machine, that shown on the drawings comprising a commercial suction pump 423 to the outlet of which the other end of the pipe or conduit 417 is connected. The suction pump shaft is connected through the usual coupling 424 with the shaft of an electric motor 425. The motor 425 and pump 423 are supported on the shelf or bracket 95.

A second electric motor 426 is mounted on the bed 85 and has keyed or otherwise secured to its shaft, a pulley 427 and about which is trained a belt 415 in turn trained about a pulley 416 on a counter shaft 415' and which counter-shaft carries a second pulley 416' and about which second pulley 416' is trained the belt 167 for driving the crank shaft or speed variator 165, as above set forth. It is believed that the setting up of a knocked-down box such as disclosed in Figs. 28, 29 and 30 is obvious from the foregoing but briefly the method is as follows:

A supply of knocked-down boxes 126 is placed in the magazine 92 and the back up and feed plate mechanism 124 released to force the said knocked-down boxes to the inner end of said magazine as clearly illustrated in Fig. 1 whereupon the motors 425 and 426 are started for respectively actuating the counter-shaft or speed reducer 165 and effecting a suction pressure within the pump 423. The operation of the counter-shaft 165 causes the cross-head 150, through the flexible rack or sprocket chain 140, to operate the transfer mechanism 93 to dispose its pickup head against the innermost knocked-down box of the supply. As soon as the said pickup head is properly positioned the valve shifter 422 shifts the valve 243 to the position opposite of that shown in the drawing thereby connecting the pump 423 through the conduit 417 with the conduit 241 and the pickup head for connecting the said innermost knocked-down box with said head.

The said cross-head 150 immediately reverses thereby reversely actuating the transfer mechanism 93 to cause its pickup head to move to a position over and on the forming mechanism table 258. At this time the cross-head 150 is at its lower limit of movement whereupon the valve actuator 422 shifts the valve 243 to the position illustrated in Fig. 4 for disconnecting the pump from the transfer head to the box forming mechanism and causing the said knocked-down box to be secured on the table 258.

At this time the cross-head 303 is elevated to cause the upright members 290 and 292 together with the ram rod 302 and ram 294 to ascend. The ascension of the ramrod 302 and ram 294 through the cams 273, 274, 292 and 293 oscillate the box end and side walls setting up mechanisms 246, 247, 275 and 276 from their lower positions as illustrated in solid lines for said mechanism 247 in Fig. 14 to the dotted line position of the said mechanism 247 in said Fig. 14. It should be noted that at the time the box blank was placed on the setting up mechanism table 258 the upright members or fingers at the ends of the end walls setting up mechanism 246 and 247 positioned the tucking flaps of the knocked-down box to be transversely of the box bottom panel.

The final setting up head and erected box discharging mechanism is driven in timed relation with the transfer head and driven from the same mechanism all as above set forth. Wherefore, as soon as the transfer head has been withdrawn sufficiently from the delivered position, the final setup and discharge head 350 of the mechanism 94 is in position for entering the now partially erected box. This head 350 through its slides 387 and 388 downwardly turn the spacer flaps of the carton end walls which movement of the head 350 continues until the said slides 387 and 388 bottom on the carton bottom panel and at which time the said spacer flaps are at an inward angle to the end walls inner wall members.

Continued downward movement of the head 350 causes the slides 387 and 388 to move upwardly relative to the slide brackets 381 and 382 thereby oscillating members 400 outwardly or toward the box end walls and thereby guiding the spacer flaps to their positions beneath the end walls inner wall members. As soon as the slides 387 and 388 have reached the limit of their movement as determined by the pin and slot 403 the entire head moves against the yielding resistance of springs 375 and 376. The movement of the head with respect to its carrying block 352 causes the links 360 and 361 to outwardly oscillate plates 364 and 365 which at this time are in face contact with the end walls inner wall members for shifting or forcing said end walls inner wall members to their operative positions. This movement of the plates 364 and 365 is limited by the engagement of the sleeves 375 and 376 with the under surface of the block 352.

At this time all of the parts of the box setting up mechanism are in their final positions and the transfer mechanism head 93 is again positioned in front of the innermost knocked-down box of the magazine or supply 92 and the valve 243 is again shifted for disconnecting the suction pump from the setting up mechanism and connecting the same to the transfer mechanism as well as connecting the suction pump with the final setup and discharge head 350. A fresh knocked-down box is thereby connected with the transfer mechanism while the completed box is now connected with the suction cup 404 of the discharge head 350.

The completed box is now dropped from the setting up mechanism for discharge from the machine either into a container or onto a discharge conveyor belt, neither of which devices is disclosed in the drawing.

It will be appreciated that the knocked-down box blank of Fig. 31 is erected or set-up in the same manner as that disclosed in Fig. 28 by having the head slides 387 and 388 engage the end walls extensions at points at about the score fold line 76 therein. By this arrangement the terminal or creeper flaps 79 are not downwardly bent or folded with respect to their end wall inner wall members but are caused to assume an inward, upward angle whereby they are eventually brought into engagement with the upper surface of the main to bottom panel 35 and arranged in their final positions as illustrated in Fig. 32.

Upon final erection, the said box or carton is removed or discharged from the machine by the head 350 as above set forth.

The modified mechanism for controlling the angular position of the transfer head with respect to its supporting shaft and sleeve, and particularly for controlling this angular position just prior to engagement with the innermost knocked-down box blank of the magazine, as illustrated in Figs. 25, 26 and 27, comprises the substitution of a sprocket 428 for the hub 171 and about which sprocket is trained an endless sprocket chain 429 which takes the place of the sprocket chain 184 above. The sprocket 428 is loosely mounted on the shaft 142 and in normal operation is retained against rotation with the shaft and in fact is rotated or oscillated in a reverse direction.

The controlling and movement of the said sprocket 428 is effected through a link 430 which has one end pivoted on a pivot stud 431 secured to and rearwardly projecting from the rear end of the sprocket 428. The other end of the link 430 is disposed and pivoted at 436 in the furcated upper end 432 of an arm 433. The arm 433 has its lower end pivoted on a stud 434 carrier by a plate 435 secured to and outwardly projecting from intermediate upright or post 91. The arm 433 has projecting from it, just below its pivotal connection 436 with the link 432, a cam follower or roller 437. The cam follower or roller 437 is disposed in a cam track 438 formed within the borders of a cam plate 439 secured to a hub 440 which in turn is keyed or otherwise secured to the shaft 142.

It will be noted from Figs. 25 and 27 that the cam track 438 is formed, in the main, about a center that is eccentric to the center of the shaft 142, thereby providing said cam track with an arcuate portion 441 for outwardly throwing or swinging the arm 433 about its pivot 434. The cam track 438, beyond its arcuate portion 441, is provided with a relatively straight portion 442 which, in effect, slows up the rate of throw or swinging of the arm 433 and at the same time in effect substantially reverses the direction of oscillation of the sprocket 428.

In operation, this mechanism controls the angular position of the transfer head with respect to its supporting shaft and lines up the axis of said transfer head with the axis of the knocked-down blanks in the magazine or supply at about the time the cam follower roller 437 reaches the end of the arcuate portion 441 of the cam track and which axes of the transfer head and magazine supply are maintained in alignment by the tail or straight portion 442 of said cam track. As noted above, the amount of travel of the transfer head after the alignment of its axis with the axis of the magazine supply is limited, wherefore, the said tail or straight portion 422 of the camway is relatively short.

From the foregoing, it is believed now evident that there has been provided a box setting-up machine that is efficient in operation and accomplishes the objects initially set forth.

What is claimed is:

1. In a box setting-up machine for setting up a box from a knocked-down blank that includes a bottom panel having side and end walls outer wall members hingedly connected to its edges with said end walls each having an inner wall member connected to its outer wall member, the combination of a frame, a magazine for a supply of knocked-down box blanks, means mounting said magazine on said frame to have the axes of the magazine and the knocked-down box blanks inclining downwardly to gravity feed said blanks through the magazine, a box setting-up mechanism on said frame including a horizontal table and located outwardly of the low end of the magazine, means carried by said frame between the said box setting-up mechanism and said low end of the magazine for transferring the box blanks individually and sequentially from the magazine to the box setting-up mechanism table, means associated with said table erecting said box outer wall members and partially setting-up the knocked-down box, and additional means carried by said frame positioning the end walls inner wall members and completing the setting up of the box and removing the set-up box from the box setting-up mechanism table.

2. In a box setting-up machine for setting up a box from a knocked-down box blank that includes a bottom panel having side and end walls hingedly connected to its edges, the combination of a frame, a magazine for a supply of knocked-down box blanks, a box setting-up mechanism including a horizontal table in spaced relation to the magazine and receiving a box blank from the magazine, means carried by said horizontal table for retaining a knocked-down box blank on said table with the side and end walls of the knocked-down box blank outwardly of the table, a hingedly mounted plate adjacent each edge of the table and swingable from a position outwardly of the table to a position substantially normal thereto for correspondingly positioning the side and end walls of the knocked-down blank, a vertically movable cam plate having a cam track beneath the table, means for vertically moving the said cam plate, means connecting the cam track and swingable plates for swinging said plates upon vertical movement of the cam plate, and means between the said box setting up mechanism and magazine for transferring the box blanks individually and sequentially from the magazine to the box setting-up mechanism table.

3. In a box setting-up machine for setting up a box from a knocked-down box blank that includes a bottom panel having side and end walls hingedly connected to its edges, the combination of a frame, a magazine for a supply of knocked-down box blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down blank side and end walls swingable plates, and means between said box setting-up mechanism and the said discharge end of the magazine for transferring the knocked-down box blanks individually to the setting-up mechanism table.

4. In a box setting-up machine for setting up a box from a knocked-down blank that includes a bottom panel having side and end walls hingedly connected to its edges, the combination of a frame, a magazine for a supply of knocked-down blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down blank side and end walls swingable plates, including a ram having formed thereon a seat for each cam plate and which seats are located at right angles to one another for correspondingly positioning the cam plates, and means for securing the cam plates to their seats, and means between said box setting-up mechanism and the said discharge end of the magazine for transferring the knocked-down box blanks individually to the setting-up mechanism table.

5. In a box setting up machine for setting up a box from a knocked-down blank that includes a bottom panel having side and end walls hingedly connected to its edges, the combination of a frame, a magazine for a supply of knocked-down blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving the cam plates for simultaneously swinging the knocked-down box blank side and end walls swingable plates, including a ram having formed thereon a seat for each cam plate and which seats are located at right angles to one another for correspondingly positioning the cam plates means for securing the cam plates to their seats, a vertically movable ramrod, and a separable connection between the ramrod and ram whereby the parts may be readily separated from one another, and means between said box setting-up mechanism and the said discharge end of the magazine for transferring the knocked-down box blanks individually to the setting-up mechanism table.

6. In a box setting-up machine for setting up a box from a knocked-down blank that includes a bottom panel having side and end walls hingedly connected to its edges, the combination of a frame, a magazine having a discharge end for a supply of knocked-down box blanks, a box setting-up mechanism spaced from said magazine discharge end, said box setting-up mechanism including a horizontal table substantially rectangular in plan, means associated with said horizontal table for retaining a knocked-down box blank thereon with the side and end walls thereof outwardly of the table, a hingedly mounted plate adjacent each edge of the table beneath a side or end wall and with said plates swingable from a position outwardly of the table to a position substantially normal thereto for correspondingly positioning the knocked-down blank end and side walls, a pair of pillars depending from each side of said horizontal plate and each pair of pillars supplying the pivotal mounting for a swingable plate, an oscillatable arm pivotly carried by each pair of pillars, a cam plate disposed between each pair of pillars with each cam plate having a trackway within its borders, a cam trackway follower carried by each oscillatable arm operatively associated with a cam trackway, means supporting said cam plates for simultaneous vertical movement for simultaneously oscillating the oscillatable arms and swinging the side and end walls swinging plates, and means for transferring the knocked-down box blanks individually and sequentially from the magazine to the box setting-up mechanism table.

7. In a box setting-up machine for setting up a box from a knocked-down blank that includes a bottom panel having side end walls hingedly connected to its edges, the combination of a frame, a magazine having a discharge end for a supply of knocked-down box blanks, a box setting-up mechanism spaced from said magazine discharge end, said box setting-up mechanism including a horizontal table substantially rectangular in plan, means associated with said horizontal table for retaining a knocked-down box blank thereon with the side and end walls thereof outwardly of the table, a hingedly mounted plate adjacent each edge of the table beneath a side or end wall and with said plates swingable from a position outwardly of the table to a position substantially normal thereto for correspondingly positioning the knocked-down blank end and side walls, a pair of pillars depending from each side of said horizontal plate and each pair of pillars supplying the pivotal mounting for a swingable plate, an oscillatable arm pivotally carried by each pair of pillars, a cam plate disposed between each pair of pillars with each cam plate having a trackway follower carried by each oscillatable arm operatively associated with a cam trackway, means supporting said cam plates for simultaneous vertical movement for simultaneously oscillating the oscillatable arms and swinging the side and end walls swinging plates, including a ram having formed therein a seat for each plate, and means for securing each cam plate to its seat, and means for transferring the knocked-down box blanks individually and sequentially from the magazine to the box setting-up mechanism table.

8. In a box setting-up machine for setting up a box from a knocked-down blank that includes a bottom panel having side and end walls hingedly connected to its edges, the combination of a frame, a magazine having a discharge end for a supply of knocked-down box blanks, a box setting-up mechanism spaced from the discharge end of the magazine, means between said box setting-up mechanism and the said discharge end of the magazine for transferring the knock-down box blanks individually to the setting-up mechanism table, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down box blank side and end walls swingable plates, including a ram having formed thereon a seat for each cam plate and which seats are located at right angles to one another for correspondingly positioning the cam plates, means for securing the cam plates to their seats, a ramrod for reversely reciprocating the ram and cam plates and correspondingly reversely actuating the box blank end and side walls swingable plates, and means operable upon the reverse actuation of the swingable plates for removing the setup box from the setting-up mechanism horizontal table.

9. In a box setting-up machine for setting up a box from a knocked-down box blank that includes a bottom panel having side and end walls hingedly connected to its edges, the combination of a frame, a magazine for a supply of knocked-down box blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down box blank side and end walls swingable plates, means between said box setting-up mechanism and the discharge end of the magazine for transferring the knocked-down box blanks individually to the setting-up mechanism table, and means operable after the actuation of the box blank side and end walls swingable plates for removing the erected box from the setting-up mechanism table.

10. In a box setting-up machine for setting up a box from a knocked-down box blank that includes a bottom panel having side and end walls hingedly connected to its edges, the combination of a frame, a magazine for a supply of knocked-down box blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down box blank side and end walls swingable plates, means between said box setting-up mechanism and the discharge end of the magazine for transferring the knocked-down box blanks individually to the setting-up mechanism table, means operable after the actuation of the box blank side and end walls swingable plates for removing the erected box from the setting-up mechanism table, said means carried by the box setting-up mechanism horizontal table for retaining the box blank thereon the knocked-down box blank transfer means and the erected box removing means each including a pneumatic suction cup whereby said knocked-down box blank is removably secured to the transfer mechanism, box setting-up horizontal table and set-up box removing means, and means for sequentially energizing said pneumatic suction cups.

11. In a box setting-up machine for setting up a box from a knocked-down blank that includes a bottom panel side and end walls hingedly connected to the bottom panel edges, and tucking flaps at the ends of two opposed of said walls, the combination of a frame, a magazine for a supply of knocked-down blanks, a box setting-up mechanism including a horizontal table spaced from the discharge end of the magazine, means carried by said table for retaining a knocked-down box blank on said table with the side and end walls of the knocked-down blank outwardly of the table, a hingedly mounted plate adjacent each edge of the table and swingable from a position outwardly of said table to a position substantially normal thereto for correspondingly positioning the side and end walls of the knocked-down box blank, two opposite swingable plates for disposing the tucking flaps at right angles to their carrying walls prior to the actuation of the swingable plates, a vertically movable cam plate for each swingable plate beneath the table, said cam plates being mounted opposite one another in pairs and each plate of each pair having a cam track of an opposite hand, means connecting each swingable plate with the cam track of one of the cams, means simultaneously vertically moving said cam plates for simultaneously swinging the knocked-down box blank side and end walls swingable plates, and means between said box setting-up mechanism and the said discharge end of the magazine for transferring the knocked-down box blanks individually to the setting-up mechanism table.

12. In a box setting-up machine for setting up a box from a knocked-down blank that includes a bottom panel having side and end walls outer wall members hingedly connected to its edges with said end walls outer wall members each having an inner wall member hingedly connected thereto, the combination of a frame, a magazine for a supply of knocked-down box blanks, a box setting-up mechanism carried by said frame and including a horizontal table in spaced relation to the magazine and receiving a box blank from the magazine, means carried by said horizontal table for retaining a knocked-down box blank on said table with the side and end walls of the knocked-down box blank outwardly of the table, a hingedly mounted plate adjacent each edge of the table and swingable from a position outwardly of the table to a position substantially normal thereto for correspondingly positioning the side and end walls outer wall members of the knocked-down blank, said end walls outer wall members swingable plates each including means for disposing said end walls inner wall members at right angles to their outer wall members, a vertically movable cam plate having a cam track beneath the table, means for vertically moving the said cam plate, means connecting the cam track and swingable plates for swinging said plates upon vertical movement of the cam plate, means carried by the frame between the said box setting-up mechanism and magazine for transferring the knocked-down box blanks individually from the magazine to the box setting-up mechanism table, and means carried by the frame including box final setting-up means for inwardly folding said end walls inner wall members and removing the set up box from the box setting-up mechanism horizontal table.

References Cited in the file of this patent

UNITED STATES PATENTS

| | | |
|---|---|---|
| 1,547,948 | Nevins | July 28, 1925 |
| 1,627,920 | Milmoe | May 10, 1927 |
| 1,906,051 | Federwitz et al. | Apr. 25, 1933 |
| 2,458,341 | Cake | Jan. 4, 1949 |
| 2,518,014 | Inman | Aug. 8, 1950 |
| 2,612,087 | Willbrandt | Sept. 30, 1952 |
| 2,624,248 | Baker et al. | Jan. 6, 1953 |
| 2,737,861 | Watson | Mar. 13, 1956 |
| 2,741,957 | Haas | Apr. 17, 1956 |
| 2,808,766 | Larsen | Oct. 8, 1957 |